(12) United States Patent
Matus et al.

(10) Patent No.: US 12,016,265 B1
(45) Date of Patent: Jun. 25, 2024

(54) SYSTEM AND METHOD FOR AUTOMATED GROUNDS MAINTENANCE

(71) Applicant: RENU ROBOTICS CORP., San Antonio, TX (US)

(72) Inventors: Tim Alan Matus, San Antonio, TX (US); Michael D. Eyman, Austin, TX (US); Tony Padgett, San Antonio, TX (US); Jeff Dayov, Austin, TX (US); Michael Odell Blanton, Jr., San Antonio, TX (US)

(73) Assignee: RENU ROBOTICS CORP., San Antonio, TX (US)

( * ) Notice: Subject to any disclaimer, the term of this patent is extended or adjusted under 35 U.S.C. 154(b) by 0 days.

(21) Appl. No.: 17/963,967

(22) Filed: Oct. 11, 2022

Related U.S. Application Data

(63) Continuation of application No. 16/748,465, filed on Jan. 21, 2020, now Pat. No. 11,510,361.

(51) Int. Cl.
*A01D 34/00* (2006.01)
*A01D 34/74* (2006.01)
*B60W 60/00* (2020.01)
*G05D 1/00* (2006.01)
*H04B 3/54* (2006.01)

(52) U.S. Cl.
CPC .......... *A01D 34/008* (2013.01); *A01D 34/74* (2013.01); *B60W 60/0023* (2020.02); *G05D 1/0217* (2013.01); *G05D 1/0219* (2013.01); *G05D 1/0225* (2013.01); *H04B 3/544* (2013.01)

(58) Field of Classification Search
CPC . A01D 34/008; A01D 34/74; B60W 60/0023; G05D 1/0217; G05D 1/0219; G05D 1/0225; G05D 2201/0207; G05D 2201/0208; H04B 3/544
See application file for complete search history.

(56) References Cited

U.S. PATENT DOCUMENTS

| | | | |
|---|---|---|---|
| 2007/0142964 A1* | 6/2007 | Abramson | A47L 9/2852 700/245 |
| 2016/0174459 A1* | 6/2016 | Balutis | B25J 9/1674 701/25 |
| 2019/0075722 A1* | 3/2019 | Miller | A01B 59/048 |
| 2019/0075724 A1* | 3/2019 | Becke | A01D 69/02 |
| 2020/0386849 A1* | 12/2020 | Kameyama | G01S 19/48 |

* cited by examiner

*Primary Examiner* — Jaime Figueroa
*Assistant Examiner* — Zachary Joseph Wallace

(57) ABSTRACT

A grounds maintenance system comprising: a robot tractor comprising; a robot body; a drive system including one or more motorized drive wheels to propel the robot body; a control system coupled to the drive system, the control system configurable to store a mow plan that specifies a set of paths to be traversed for a grounds maintenance operation and control the drive system to autonomously traverse the set of paths to implement the mow plan; a battery system comprising one or more batteries housed in the robot body; and a low-profile mowing deck coupled to the robot body, the mowing deck adapted to tilt and lift relative to the robot body, wherein the control system is configured to control tilting and lifting of the mowing deck and cutting by the mowing deck.

20 Claims, 20 Drawing Sheets

SYSTEM AND METHOD FOR AUTOMATED GROUNDS MAINTENANCE

RELATED APPLICATIONS

This application is a continuation of, claims benefit of and priority to, and incorporates by reference herein in their entirety the following: pending U.S. patent application Ser. No. 16/748,465, filed Jan. 21, 2020, titled "SYSTEM AND METHOD FOR AUTOMATED GROUNDS MAINTENANCE", which in turn claims benefit and priority to U.S. Provisional Application No. 62/918,161, filed Jan. 17, 2019, titled "SYSTEM AND METHOD FOR AUTOMATED GROUNDS MAINTENANCE".

TECHNICAL FIELD

The present application relates in general to autonomous mobile maintenance robots. More specifically, embodiments relate to computer controlled, autonomous mobile maintenance robots and methods for automated maintenance. Even more particularly, embodiments of this application relate autonomous mobile maintenance robots and methods that perform automated maintenance with respect to renewable energy installations.

BACKGROUND

Renewable energy is becoming a larger and larger component of energy production across the world. Renewable energy farms are typically located on large plots of lands, often in rural or remote areas. In general, it is desirable to have substantial ground cover on renewable energy farms, both for aesthetic reasons and to resist ground erosion. With ground cover, however, comes the attendant problem of managing vegetation. Improper maintenance of the grounds can lead to overgrown vegetation, weed infestations, reduced production, unsafe working conditions and increased fire risk.

With the advent of industrial mowers, it has become easier to maintain large areas of real estate. However, the use of such mowers still represents a large investment in human capital. Moreover, the variable nature of such maintenance remains hard to predict. Consequently, the need for grounds maintenance retards the growth of renewable energy.

SUMMARY

One embodiment comprises a grounds maintenance system. The grounds maintenance system can include a robot tractor comprising: a robot body, a drive system including one or more motorized drive wheels to propel the robot body, a control system coupled to the drive system, and a battery system comprising one or more batteries housed in the robot body. The control system is configurable to store a maintenance plan, such as a mow plan, that specifies a set of paths to be traversed for a grounds maintenance operation and control the drive system to autonomously traverse the set of paths to implement the mow plan. The robot tractor may push or pull a tool to perform a maintenance operation. In one embodiment a low-profile mowing deck is coupled to the robot body. The mowing deck is adapted to tilt and lift relative to the robot body. The control system is configurable to control tilting and lifting of the mowing deck and cutting by the mowing deck. According to one embodiment, the mowing deck comprises a plurality of mower blades coupled to a plurality of mower motors, wherein the control system is configured to control the mower motors. According to one embodiment, the drive system includes at least two drive wheels drivable to propel and turn the robot tractor. In accordance with one aspect of the present disclosure, the robot tractor is a zero-turn tractor.

According to one embodiment, the system further includes a tool mounting bracket vertically slidable relative to the robot body. The mowing deck is connected to the tool mounting bracket by a hinge that is movable with the tool mounting bracket. A tilt actuator system is movable with the tool mounting bracket. The tilt actuator system is adapted to rotate the mowing deck about the hinge. The control system is configurable to control the tilt actuator system to tilt and un-tilt the mowing deck. According to one embodiment, the system further includes a lift actuator system adapted to vertically translate the tool mounting bracket. The control system is coupled to the lift actuator system and is configurable to control the lift actuator system to lift and lower the mowing deck.

According to one embodiment, the system further includes a plurality of contact wheels, a plurality of contact wheel linkages rotatably coupled to the mowing deck and a contact wheel actuator system adapted to rotate the plurality of contact wheel linkages relative to the mowing deck to move the contact wheels relative to the mowing deck. The control system is configurable to control the contact wheel actuator system to maintain contact between the plurality of contact wheels and the ground.

The robot tractor may further comprise a charger interface, wherein the charger interface comprises a charger power interface and a charger data interface. According to one embodiment, the robot tractor comprises a pair of robot charger contacts, the pair of robot charger contacts comprising laterally extending plates of conductive material.

According to one embodiment, the system further comprises a charging station that includes a charging dock to receive the robot tractor. The charging dock comprises a support frame and a set of contact holders coupled to the support frame. The contact holders are vertically translatable relative to the support frame. More particularly, the set of contact holders include a first contact holder holding a first charging station contact from the pair of charging station contacts and a second contact holder holding a second charging station contact from the pair of charging station contacts. The first charging station contact has a first charging station contact ramp portion that extends beyond the first contact holder and is angled downward. The first contact holder is adapted to position the first charging station contact so that the first charging station contact ramp portion aligns with a first robot charger contact of the pair of robot charger contacts. The first contact holder is adapted to be pressed down by the first robot charger contact when the robot tractor docks. The second charging station contact has a ramp portion that extends beyond the second contact holder and is angled downward. The second contact holder is adapted to position the second charging station contact so that the second charging station contact ramp portion aligns with a second robot charger contact of the pair of robot charger contacts. The second contact holder is adapted to be pressed down by the second robot charger contact when the robot tractor docks. The charging station dock may further include a first biasing member to bias the first charging station contact against the first robot charger contact when the robot tractor is docked and a second biasing member to bias the second charging station contact against the second robot charger contact when the robot tractor is docked.

According to one embodiment, the control system of the robot tractor is configurable to control the drive system to maneuver the robot tractor to a position associated with being docked at a charging station, based on a determination that the robot tractor is at the position, attempt to establish communication with the charging station via the charger data interface using a communication protocol and determine if communication was established between the robot tractor and the charging station via the charger data interface. Based on a determination that communication could not be established with charging station, the control system can control the drive system to redock the robot tractor at the charging station. Based on a determination that communication could be established with the charging station, the control system can initiate charging of the one or more batteries. According to one embodiment, the communication protocol used is a power-line protocol.

According to one embodiment the control system is configurable to store a return to charger decision model, the return to charger decision model trained to output a return to charger decision. The control system can also be configurable to store, for each of the set of paths, an associated expected power draw. The control system can also be configurable to read a current battery capacity, determine a current position in the mow plan and access a set of battery maintenance parameters. Based on the current position in the mow plan, the control system can determine a remaining portion of the mow plan and determine a route to a charging station. The control system can further determine an estimated power to complete the mow plan using expected power draws associated with the remaining portion of the mow plan and determine an estimated power to reach the charging station using expected power draws associated with the route to the charging station. The control system can be configurable to apply the return to charger decision model to a set of inputs to determine whether to continue on a current path or return to the charging station. The set of inputs can comprise the current battery capacity, the estimated power to complete the mow plan, the estimated power to reach the charging station and the set of battery maintenance parameters.

According to one embodiment, the control system is configurable to, determine a current power draw for a current path of the mow plan, determine a historical power draw for the current path of the mow plan, compare the current power draw to the historical power draw to generate a comparison result and, prior to applying the return to charger decision model to the estimated power to complete the mow plan, adjust the estimated power to complete the mow plan based on the comparison result. For example, the control system can be configurable to: increase the estimated power to complete the mow plan based on a determination that the current power draw for the current path of the mow plan is greater than the historical power draw for the current path; and decrease the estimated power to complete the mow plan based on a determination that the current power draw for the current path of the mow plan is less than the historical power draw for the current path.

One embodiment of a grounds maintenance method comprises storing a mow plan in a memory of a control system of an autonomous robot tractor, the mow plan specifying a set of paths to be traversed for a grounds maintenance operation. The robot tractor can comprise a robot body; a drive system including one or more motorized drive wheels to propel the robot body; a battery system comprising one or more batteries housed in the robot body; and the control system. The method may further include executing the mow plan by the control system. Executing the mow plan can comprise controlling the drive system to autonomously traverse the set of paths and controlling a tilt and lift of and cutting by a low-profile mowing deck coupled to the robot body. The mowing deck can be adapted to tilt and lift relative to the robot body.

According to one embodiment, the method includes controlling the drive system to maneuver the robot tractor to a position associated with being docked at a charging station; based on a determination that the robot tractor is at the position, attempting to establish communication between the robot tractor and the charging station via a charger data interface using a communication protocol; determining if communication was established between the robot tractor and the charging station via the charger data interface; and based on a determination that communication could not be established with charging station, controlling the drive system to redock the robot tractor at the charging station. According one embodiment, the communication protocol is a power-line communication protocol.

The grounds maintenance method may include storing a return to charger decision model in the control system of the robot tractor, the return to charger decision model trained to output a return to charger decision; and storing, for each of the set of paths, an associated expected power draw. The method can further include: reading a current battery capacity; determining a current position in the mow plan; determining a remaining portion of the mow plan; determining a route to a charging station; determining an estimated power to complete the mow plan using expected power draws associated with the remaining portion of the mow plan; determining an estimated power to reach the charging station using expected power draws associated with the route to the charging station; accessing a set of battery maintenance parameters; and applying the return to charger decision model to a set of inputs to determine whether to continue on a current path of the mow plan or return to the charging station, the set of inputs comprising the current battery capacity, the estimated power to complete the mow plan, the estimated power to reach the charging station and the set of battery maintenance parameters.

According to one embodiment, a grounds maintenance method can further include: determining a current power draw for the current path of the mow plan; determining a historical power draw for the current path of the mow plan; comparing the current power draw to the historical power draw to generate a comparison result; and prior to applying the return to charger decision model to the estimated power to complete the mow plan, adjusting the estimated power to complete the mow plan based on the comparison result. According to one embodiment, adjusting the estimated power to complete the mow plan based on the comparison result comprises increasing the estimated power to complete the mow plan based on a determination that the current power draw for the current path of the mow plan is greater than the historical power draw for the current path. According to another embodiment, adjusting the estimated power to complete the mow plan based on the comparison result comprises decreasing the estimated power to complete the mow plan based on a determination that the current power draw for the current path of the mow plan is less than the historical power draw for the current path.

BRIEF DESCRIPTION OF THE DRAWINGS

The drawings accompanying and forming part of this specification are included to depict certain aspects of the disclosure. It should be noted that the features illustrated in the drawings are not necessarily drawn to scale, and that they are only illustrative non-limiting embodiments. A more complete understanding of the disclosure and the advantages thereof may be acquired by referring to the following description, taken in conjunction with the accompanying drawings in which like reference numbers indicate like features and wherein.

DETAILED DESCRIPTION

Figure 1A:
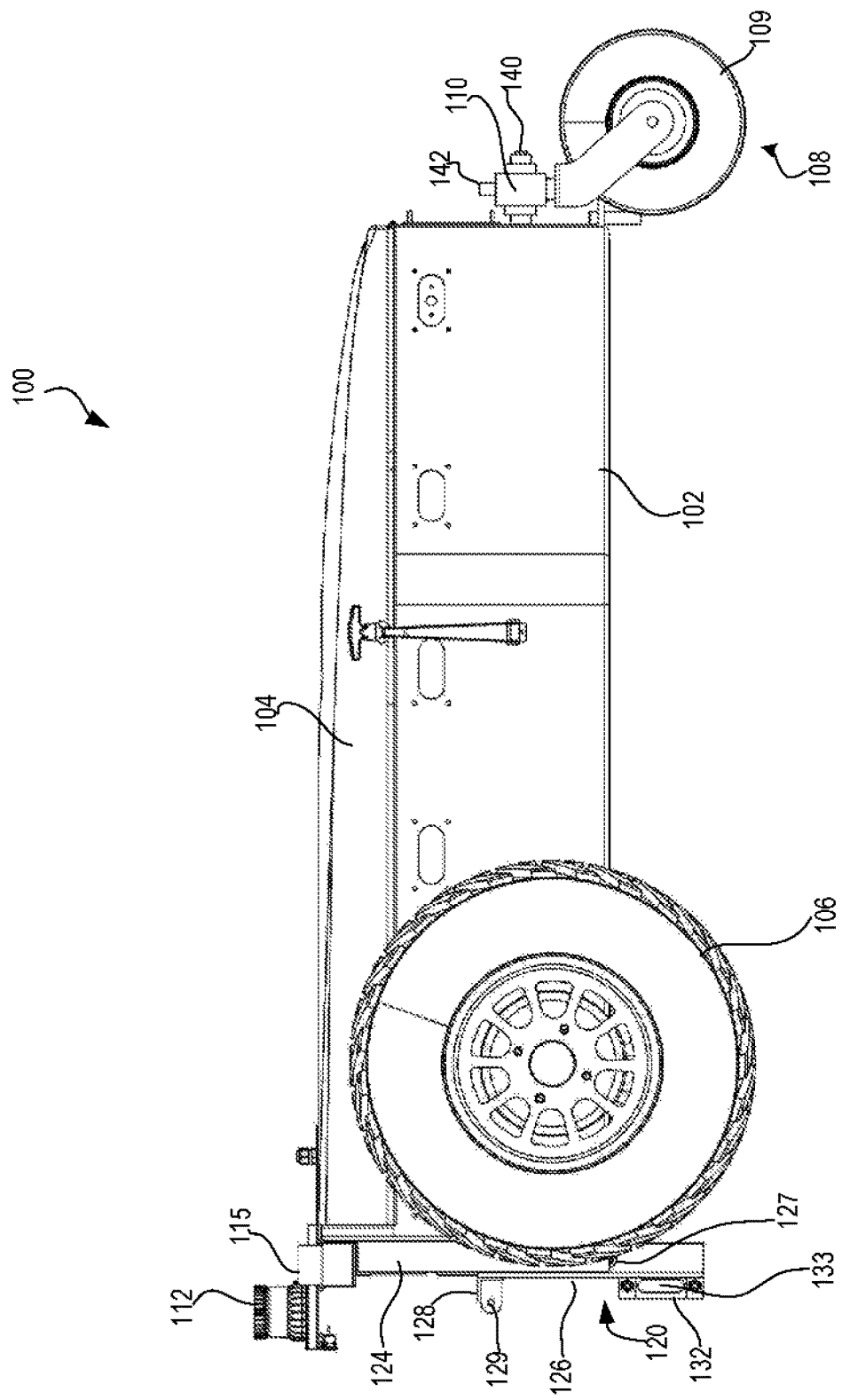
FIG. 1A is a side view of one embodiment of an autonomous robot tractor.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Embodiments described herein provide mobile automated maintenance systems and related methods. In particular, some embodiments are adapted to provide maintenance operations for facilities and installations on large acreage where ground cover is desired to prevent soil/ground erosion, provide pleasing aesthetics or for other reasons. While embodiments are primarily discussed in terms of maintenance operations at solar farms, it will be appreciated that embodiments described herein have applicability to other renewable energy or power generation facilities or installations, such as wind turbine farms, ash ponds or other facilities or installations. Furthermore, it will be appreciated that embodiments have applicability beyond renewable energy where ground vegetation, or ground environment, management is necessary or desired.

Maintenance operations may include, but are not limited to security operations, physical maintenance operations (such as cleaning solar panels from debris), fertilizer operations, herbicide operations pesticide operations, inspection operations or other maintenance operations. Embodiments of mobile automated maintenance systems can be adapted to perform maintenance operations including but not limited to, mowing, spraying for pests, spraying insecticides, inspections of infrastructure (including solar panels) (e.g., inspection with multispectral cameras capturing image data within specific wavelength ranges across the electromagnetic spectrum), inspection of combiner boxes, inspections of wire connections, washing of solar panels, security monitoring of the area, replacement of failed components or other maintenance operations.

Each mobile automated maintenance system can comprise an autonomous robot having a variety of sensors, such as, but not limited to LI DAR (light detection and ranging), RADAR (Radio Detection and Ranging), IMU (inertial measurement unit), inertial navigation systems, temperature sensors, humidity sensors, noise sensors, accelerometers, pressure sensors, GPS (global positioning system), ultrasonic sensors, cameras or other sensors. LIDAR may include, in some examples, 3D laser scanning, or a combination of 3D scanning and laser scanning. The autonomous robot implements autonomous navigation to navigate a work area, using its sensors for collision avoidance and to adjust routing as needed. The robot may be communicatively connected to a central management system through a GPRS (General Packet Radio Service) network or other cellular data network or cell-based radio network technology mobile network, an IEEE 802.IIx wireless network or any other network modality. Any number of networks (of the same or different types) may be present and used in any combination suitable for performing any one or more of the methodologies described herein.

In an embodiment, a mobile automated maintenance system is an autonomous mowing system. The mowing system includes one or more blades disposed below a mowing deck. One of the challenges with respect to solar farms is that the panels themselves can be static or continuously moving and may need to be close to the ground in order to perform optimally. Traditional mowing machines have insufficient vertical clearance to allow them to operate continuously without regard to the panel movement themselves. Traditional mowing technologies use a mowing surface that is wholly, or at least mostly, contained within the main wheelbase of the mower itself. In other words, the wheels are outside of the mowing surface itself. This presents a problem where the physical plant (e.g., engine, drive motors or other substantial physical components of the mower) is disposed above the mowing surface, creating a mowing system that is substantially high, reducing its utility.

Embodiments of a mobile automated maintenance system are designed to provide for low profile mowing that can pass under solar panels, even when they are positioned close to the ground. This is achieved, in some embodiments of a mowing system, by disposing the mowing deck forward of (or behind) the primary physical plant that houses the drive system. The mowing deck may be supported on the ground by wheels or cantilevered. Power is provided through electrical connections to motors on the mowing deck to drive the mower blades. The mowing deck may be a low-profile mowing deck that has a substantially lower profile than the primary physical plant. For example, some embodiments can operate with less than 24 inches of vertical clearance between the panel and ground, but still allow for mowing up to a height of at least 12 inches.

According to some embodiments, the height of the mowing surface can be changed using a mowing deck having an adjustable height. By way of example, but not limitation, the mowing deck is mounted on hinge pins disposed on a tractor portion of the system. A set of actuators are adapted to move a vertical slide mounted to the hinge pins, providing for vertical adjustment with those actuators. In addition, or in the alternative, a mobile automated maintenance system can include a second set of actuators that can tilt the mowing surface.

The capability to lift/tilt the mowing surface provides a mobile automated maintenance system the enhanced capability to adapt to different contours of the ground and provides the advantage of level cutting of vegetation by the mowing system. The capability to lift or tilt the mowing deck can also be used to compensate for other conditions, such as, but not limited to, friction over ground or grass height or other conditions that require the mowing surface to be adapted, either in height or in tilt, on an ongoing basis. Other features may also enhance the mower's ability to adapt to different contours. For example, as described above, the mowing deck may be supported by wheels. In some embodiments, the wheels may be operationally coupled to actuators that can be actuated to maintain a desired amount of force of the wheel or to lift a portion of the deck.

In one embodiment, the mobile automated maintenance system is a control maintenance system. The control maintenance system may include one or more water tanks and one or more chemical tanks. The control maintenance system is designed to provide herbicide and pesticide delivery. The control maintenance system may have a variety of sprayers disposed along, over, or under a support arm (e.g., a cantilever arm) intended to spray any mixture of chemicals. According to one embodiment, the control maintenance system is configured to spray around posts, buildings, fences, detected weeds, or provide general application of preventative chemicals, and the like. The control maintenance system may be used to control the growth of harmful weeds that may impact the ground cover. In another embodiment, the control maintenance system is configured to spray fertilizer across the farm. In this example, the control maintenance system promotes the healthy growth of the ground cover. In yet another embodiment, the control maintenance system is configured to spray a chemical pesticide across the arm. In this example, the control maintenance system is intended to control the population of harmful insects which may impact the healthy growth of the ground cover but may also control the population of insects which can damage electrical wires and other equipment.

In another embodiment, the maintenance system is an inspection maintenance system. The inspection maintenance system contains sensor systems that provide for inspection and security including, without limitation, 3D sensors, video cameras, still image cameras, multi-spectral images, IR sensors, temperature probes, proximity sensors, and the like. The inspection maintenance system is configured, in one example, to inspect components of the system infrastructure including solar panels, electrical connections, combiner boxes, wire runs, inverters, and the like. The acquired data from the sensors may be used by human operators of the systems, or through computer-assisted analysis, to determine the status of working components such that malfunctioning, damaged or compromised components can be identified long before they fail entirely.

In another embodiment, the inspection maintenance system may be configured to patrol the perimeter of the farm periodically taking pictures and videos so that the security of the farm can be maintained or quick alerting when a security intrusion has occurred. In a further embodiment, the inspection maintenance system may include audio alerting devices or visual alerting devices that can be used to drive intruders away or to alert system operators of the presence of a security breach. Additionally, the data from the sensors may be used to detect, either by human review or computer-assisted analysis, compromised infrastructure from instructions such as cut fencing or similar damage to perimeter or infrastructure equipment.

In an embodiment, the maintenance system is a cleaning maintenance system. The cleaning maintenance system contains an articulating arm, water tanks and chemical tanks and is configured to perform washing operations on affected solar panels. In a further embodiment, the cleaning maintenance system contains a brush disposed on an articulated arm. The cleaning maintenance system is configured to position the articulating arm over the panel, and then perform a cleaning operation on the panel. The washing operation may include, in some embodiments, a preparatory mixing operation wherein chemicals are mixed with water before the mixture is sprayed over the panel in the cleaning operation. In a further embodiment, the washing maintenance system may be configured to collect used wash water.

In an embodiment, the maintenance system is a fire protection maintenance system. The fire protection system contains fire and heat sensors, as well as fire control dispersal systems (such as an articulating arm and a fire-retardant chemical tank). The system may sense the presence of a fire and dispatch a fire protection maintenance system to the location of the fire. The fire protection system may further report the condition of the fire such that additional fire protection systems or other emergency response resources can be deployed, reducing the amount of damage created by the fire.

In an embodiment, the maintenance system is a repair maintenance system. The repair maintenance system contains an articulating arm and associated remotely operated tools such that the repair maintenance system can remove and replace broken or damaged solar panels or failed components. In one example, the repair maintenance system may perform such operations autonomously. In an alternate example, the repair maintenance system may be remotely operated for more involved repairs. Through such operations, a human operator with a network connection from anywhere, to include terrestrial and non-terrestrial locations, can perform repair and replacement functions without the need for someone to travel to the location of the repair.

In some embodiments, an autonomous robot tractor is provided that can be coupled to a variety of tools for carrying out various maintenance operations. The appropriate tools can be coupled to the tractor to form a mowing maintenance system, control maintenance system, inspection maintenance system, cleaning maintenance system, fire protection maintenance system, security maintenance system, repair maintenance system or other maintenance system.

The tractor (or other mobile automated system) may, in one embodiment, have four wheels disposed, two of which are forward and widely dispersed to the outsides of the tractor. These wheels can provide the driving force to propel the tractor and the system, including opposing propulsive force to facilitate turning. The additional two wheels are disposed to the rear of the tractor and provide stability. In an alternate embodiment, four wheels are disposed at the corners of the tractor itself where all four are modified to provide propulsive force, including turning, to the tractor. Other embodiments may employ more or fewer drive or guide wheels. In some embodiments, the tractor is a zero-turn robot—that is, the robot can achieve a turning radius that is effectively zero.

As discussed above, mobile automated maintenance systems operate on battery-stored electrical power. As such, a charging system for the mobile automated maintenance system is provided. In solar farm and wind farm installations, the charging system can operate on electrical power produced by the farm. However, there may be times when maintenance is required when the sun is obscured or wind calm. Additionally, the site may not allow for utilization of the power produced by the farm due to non-environmental, or other, factors. In these situations, the farm may be unable to provide the power needed to charge a mobile automated maintenance system. To address this issue, the charging system can be configured to rely on other power sources.

Some embodiments provide a central management system for a single facility or installation or for a number of geographically dispersed facilities or installations, each potentially with its own cadre of mobile automated maintenance systems. The central management system can provide a rich set of reporting, supervisory and control features.

Figure 1B:
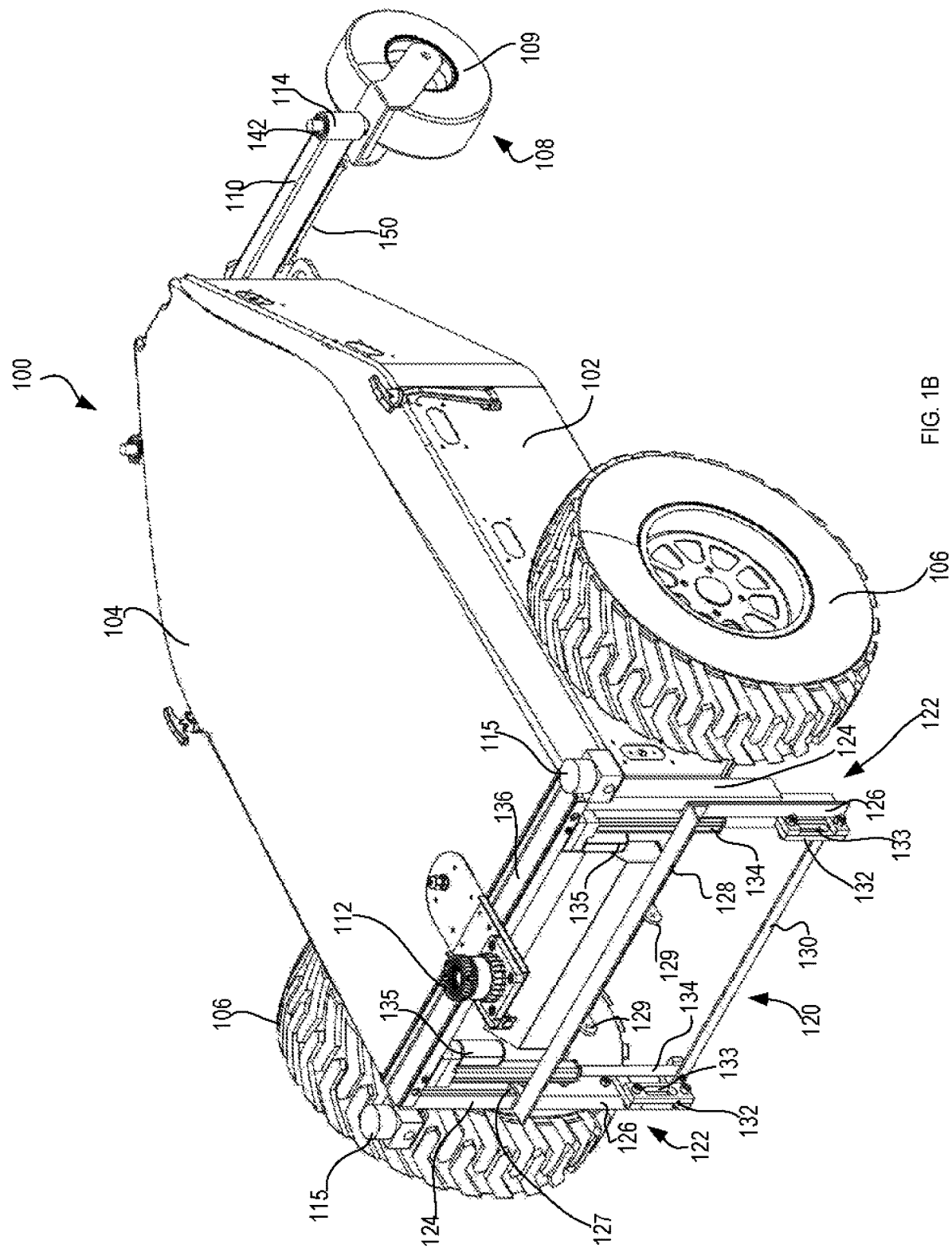
FIG. 1B is an oblique front view of an autonomous robot tractor according to one embodiment.
Figure 1C:
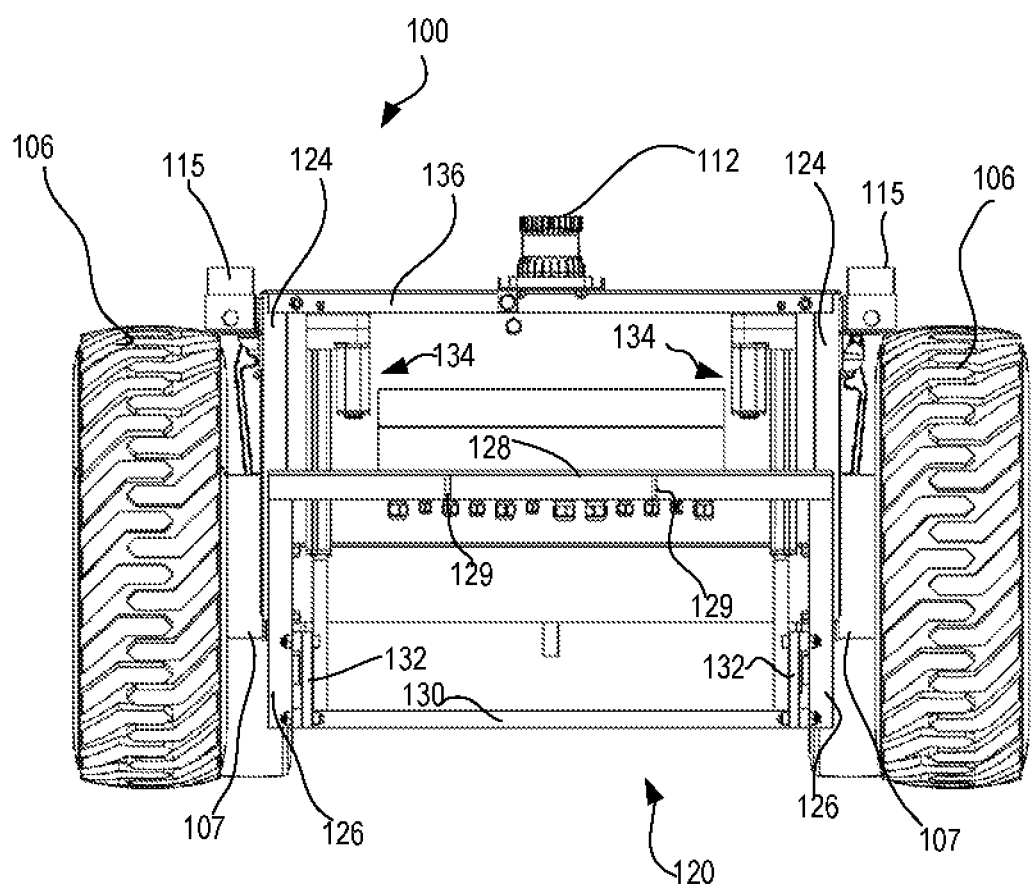
FIG. 1C is a front view of an autonomous robot tractor according to one embodiment.
Figure 1D:
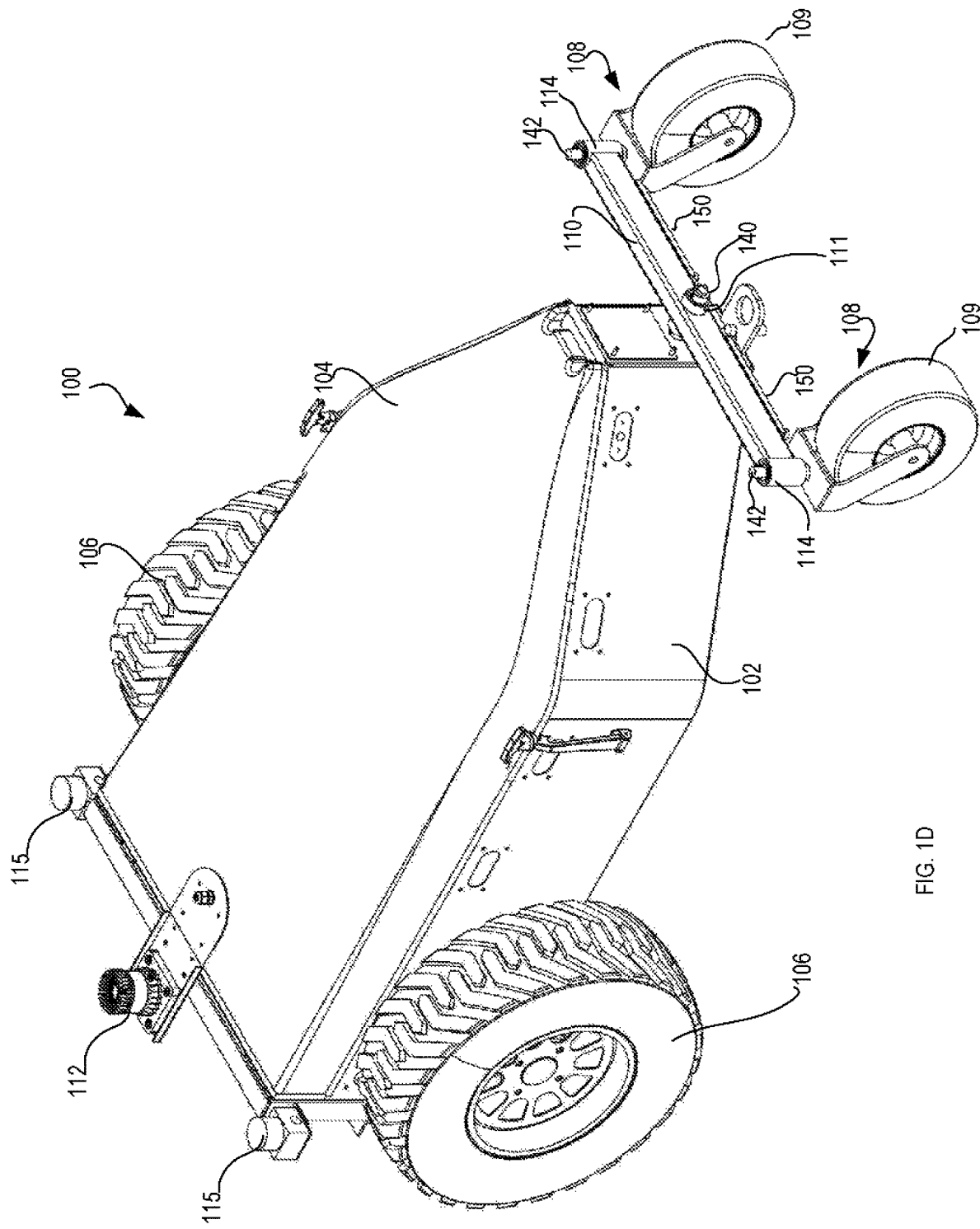
FIG. 1D is an oblique rear view of an autonomous robot tractor according to one embodiment.
Figure 1E:
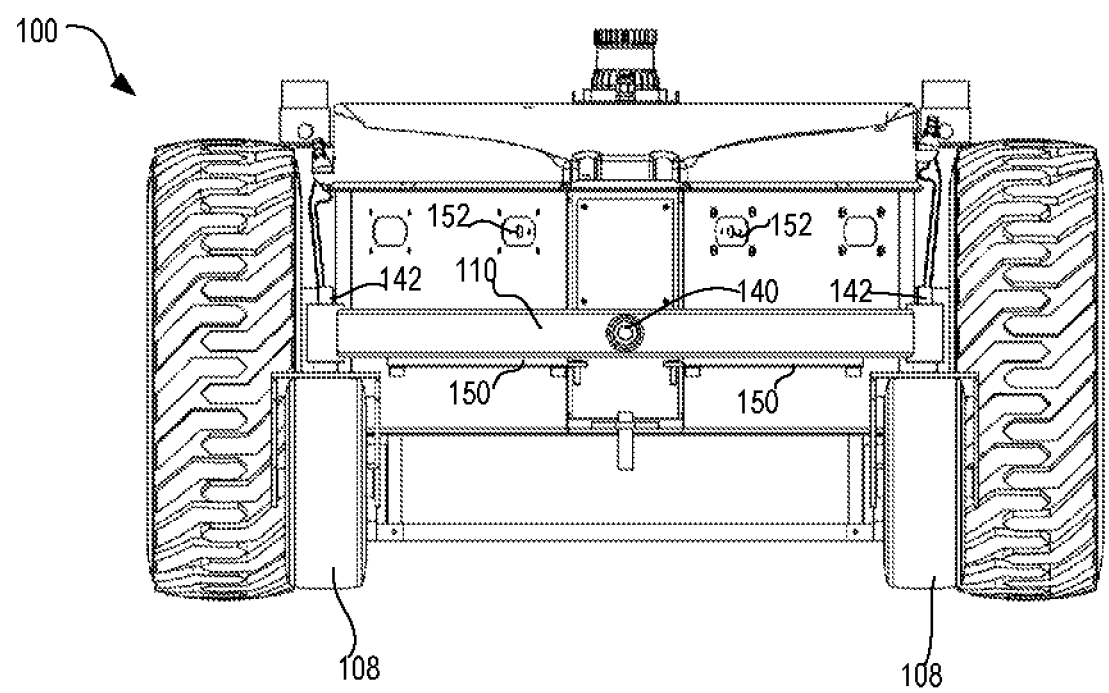
FIG. 1E is a rear view of an autonomous robot tractor according to one embodiment.

FIG. 1A is a side view of one embodiment of a mobile automated system, and more particularly, one embodiment of an autonomous robot tractor 100. FIG. 1B is an oblique front view of tractor 100 according to one embodiment, FIG. 1C is a front view of tractor 100 according to one embodiment, FIG. 1D is an oblique rear view of tractor 100 according to one embodiment and FIG. 1E is a rear view of tractor 100 according to one embodiment. According to one embodiment, tractor 100 is an autonomous robot that can be fitted with various tools to form a mobile automated maintenance system. For example, appropriate tools can be coupled to tractor 100 to form a mowing maintenance system, control maintenance system, inspection maintenance system, cleaning maintenance system, fire protection maintenance system, security maintenance system, repair maintenance system or other maintenance system. The computer system of tractor 100 is configurable such that tractor 100, with the appropriate tool attached or using its internal sensors in the case of certain data gathering operations, can autonomously perform maintenance operations. In some embodiments, the computer system allows for remote control of tractor 100.

Tractor 100 includes a main body 102 that houses various electrical components and electronics, such as batteries, drive motors, a battery management system, component controllers, sensors (e.g., LIDAR, RADAR, IMU, inertial navigation systems, temperature sensors, humidity sensors, noise sensors, accelerometers, pressure sensors, GPS, ultrasonic sensors, cameras or other sensors), network interface devices, a computer system to provide overall control of the robot, or other components. By way of example, main body 102 may house various components illustrated in FIG. 6, FIG. 7 and FIG. 13. For ease of access to such components, main body 102 may have a removable cover 104. Certain components, such as LIDAR sensor 112, cameras, emergency stop buttons 115, cameras or other components may be mounted external to main body 102 while other components of are housed in main body 102.

In the illustrated embodiment, tractor 100 includes forward drive wheels 106 and casters 108, which provide rear wheels 109 that are free to roll and turn. Drive wheels 106 are connected to hubs 107, which are driven by electric drive motors. In one embodiment, the drive motors are housed in main body 102 and are connected to hubs 107 via respective shafts or axles. In another embodiment, hubs 107 include wheel hub motors—that is, a motor is incorporated in each hub 107 and drives the hub directly. The wheels and motors are selected to achieve desired operational characteristics, such as traction, speed or other characteristics. Drive wheels 106 provide the driving force to propel the tractor and the system, including opposing propulsive force to facilitate turning. According to one embodiment, tractor 100 is a zero-turn robot—that is, tractor 100 can achieve a turning radius that is effectively zero.

Rear wheels 109 are spaced to provide stability. In the embodiment illustrated, casters 108 are coupled to a transverse support member 110 disposed to the rear of the tractor. Support member 110 is rotatably coupled to main body 102 such that support member 110 can rotate through a range of angles about a horizontal axis of rotation (e.g., the longitudinal axis of tractor 100). Support member 110 includes a collar 111 in which a bushing is disposed. A bolt, pin or other member 140 extends rearward from main body 102 through the collar 111 to provide a shaft about which support member 110 can rotate. Caster receiving collars 114 are disposed at the laterally outer ends of support member 110. Caster receiving collars 114 may include internal bushings and receive the shanks 142 of casters 108. Casters 108 can turn independently from each other. In an alternate embodiment, four wheels are disposed at the corners of a tractor main body itself where all four provide propulsive force, including turning, to tractor 100. Other embodiments may employ more or fewer drive or support wheels.

Tractor 100 includes a tool mounting bracket 120 to which a tool, such as a mower deck, can be attached. Tool mounting bracket 120 is slidably coupled to the tractor 100 by a pair of slides 122 or other linear guides such that tool mounting bracket 120 is adapted to slide vertically relative to main body 102. In the illustrated embodiment, each slide 122 comprises a first slide member 124 coupled to the main body 102 in a fixed position and a second slide member 126 movable relative to main body 102. The first slide member 124 of each slide 122 acts as a guide member and is shaped to form a track. The second slide member 126 of each slide 122 comprises an L-bracket coupled to rollers (e.g. rollers 127) disposed in the respective track. The second slide member 126 is vertically slidable relative to first slide member 124.

In the embodiment illustrated, tool mounting bracket 120 includes a tool mounting bracket upper lateral member 128 and a tool mounting bracket lower lateral member 130 spanning between the slides 122 (e.g., between the second slide members 126) and a set of forward extending side plates 132 coupled to slides 122. Tool mounting bracket upper lateral member 128 provides attachment points 129 for tilt actuators 214 and side plates 132 include hinge pin opening 133 to receive hinge pins for attaching a tool to tractor 100. In the embodiment illustrated, hinge pin openings 133 provide vertical slots.

The position of tool mounting bracket 120 is controlled by lift actuators 134, which are linear actuators driven by electric motors 135 in one embodiment. In the embodiment illustrated, the end of the drive tube of each lift actuator 134 is coupled to tool mounting bracket lower lateral member 130 and the distal end is coupled to a laterally extending member 136 that is fixed to the main body 102. By retracting the drive tubes, lift actuators 134 raise tool mounting bracket 120 and by extending the drive tubes, lift actuators 134 lower tool mounting bracket 120. As such, lift actuators 134 can lift and lower a tool (e.g., mowing deck) attached to tool mounting bracket 120. It can be noted that in other embodiments, the mowing deck may be mounted to the rear of the tractor.

As discussed above, tractor 100 may include internal batteries. To this end, tractor 100 may include a charger interface for recharging the batteries. The charger interface can include, in one embodiment, a charger power interface having charger power connections and, in some embodiments, a charger data interface having charger data interface connections for communicating with a charging station. There here are variety of charger interfaces known in the small electrical vehicle industry that are suitable for use and can be incorporated by tractor 100. However, many such charger interfaces assume that a human will be involved and require aligning a number of small pins between the complementary connectors of the EV and charging station. The mechanical mechanisms to ensure proper alignment for an autonomous robot with a charging station using such a charger interface can become relatively complex.

Some embodiments described herein provide a charger interface that provides a wider degree of latitude, allowing the tractor 100 to more easily dock with a charging station. With reference to FIG. 1E, the robot-side of the charger interface comprises a pair of robot charger contacts 150 disposed on the rear of tractor 100. The contacts comprise laterally extending, flat strips of suitably conductive material. One robot charger contact 150 provides the positive terminal and the other robot charger contact 150 provides negative terminal for charging. The plates are coupled via a wiring harness, which can run through opening 152, or other openings in the tractor body, to the internal electrical system of tractor 100. Contacts 150 are placed such that they will contact corresponding contacts of a charging station. As discussed below, in some embodiments, tractor 100 can establish data communication with a charging station using power-line communication. In such an embodiment, contacts 150 provide shared connections for the charger power interface and the charger data interface.

Figure 2A:
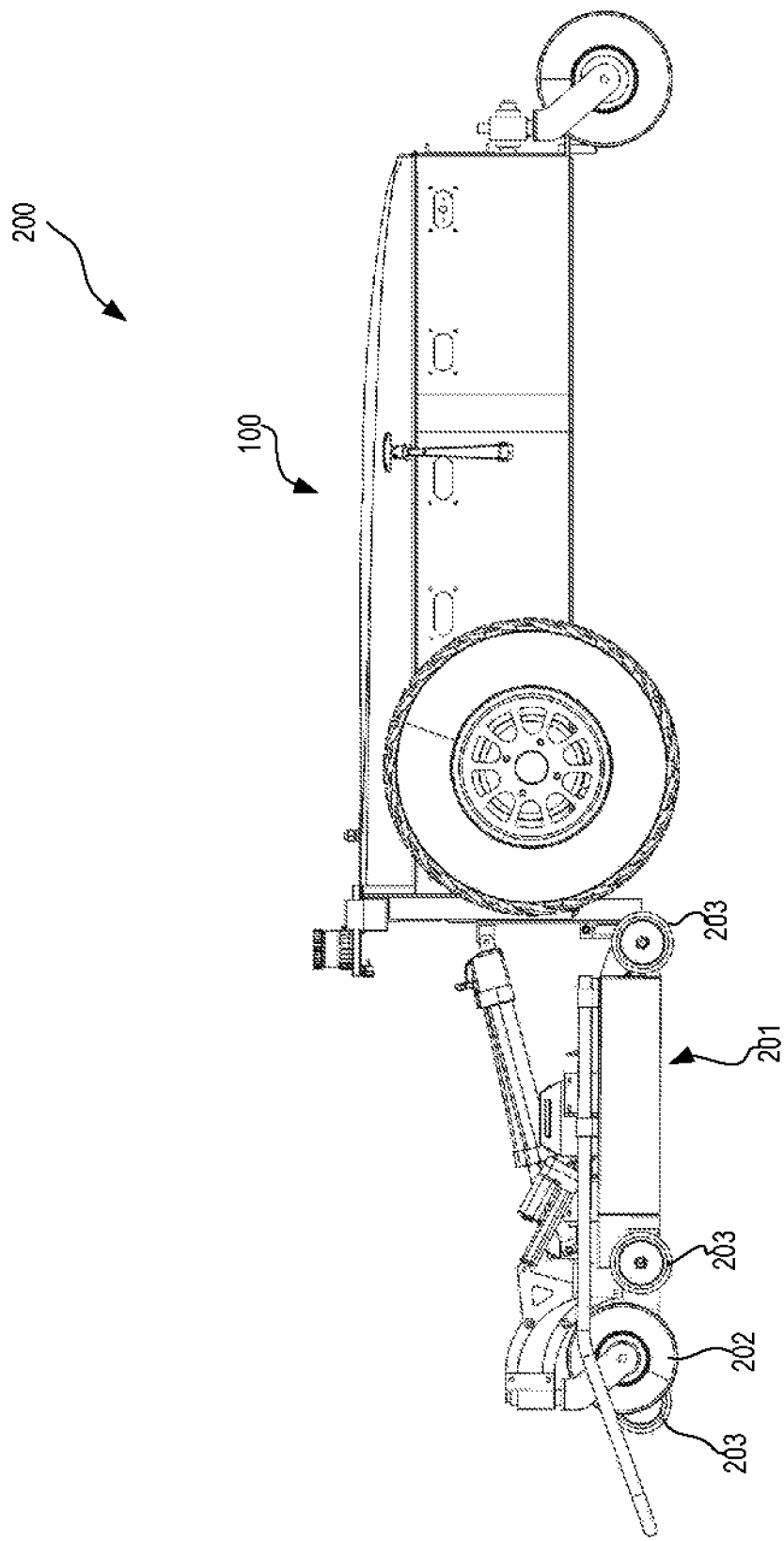
FIG. 2A is a side view of one embodiment of a mowing system.
Figure 2B:
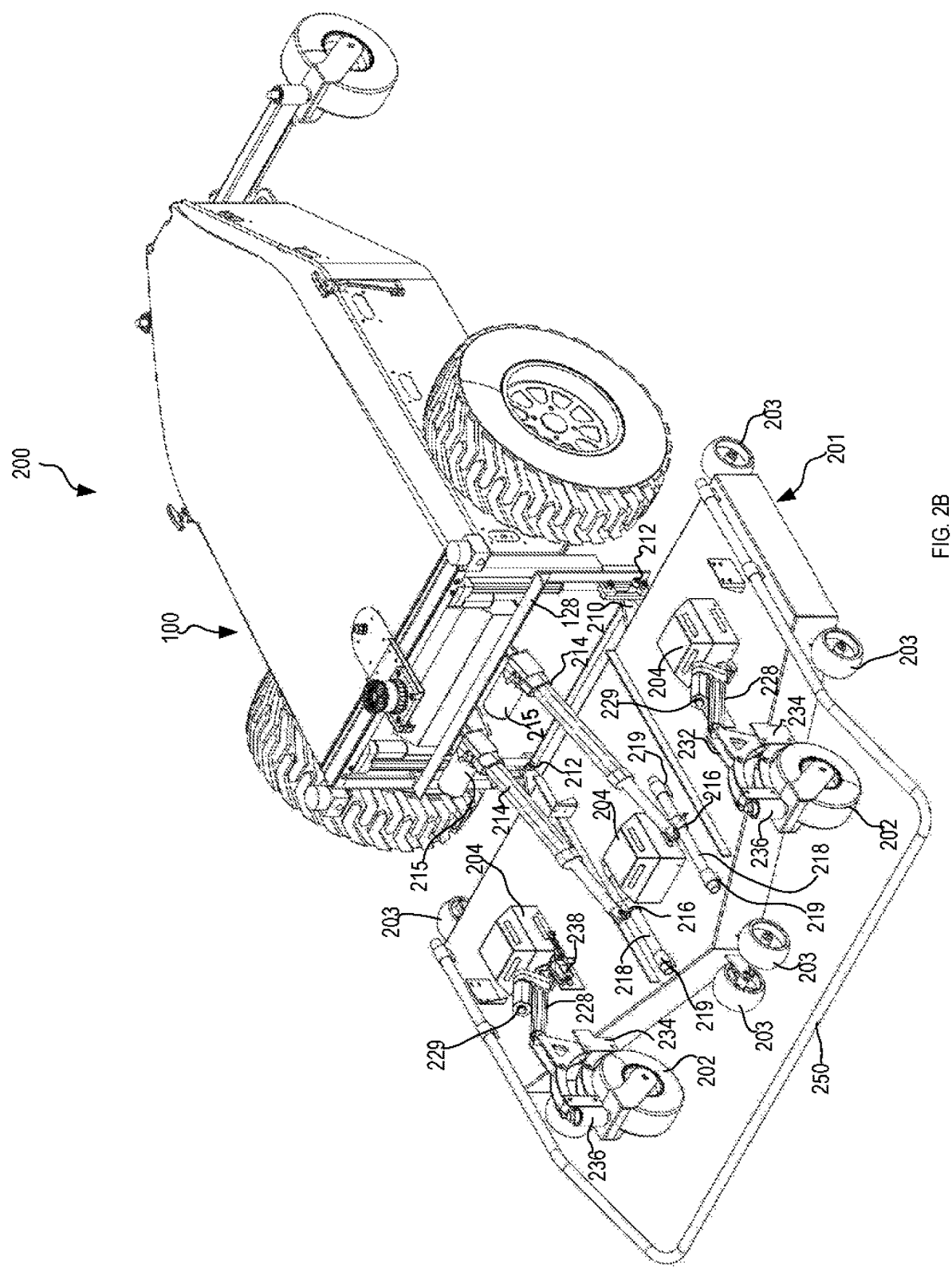
FIG. 2B is an oblique front view of one embodiment of a mowing system.
Figure 2C:
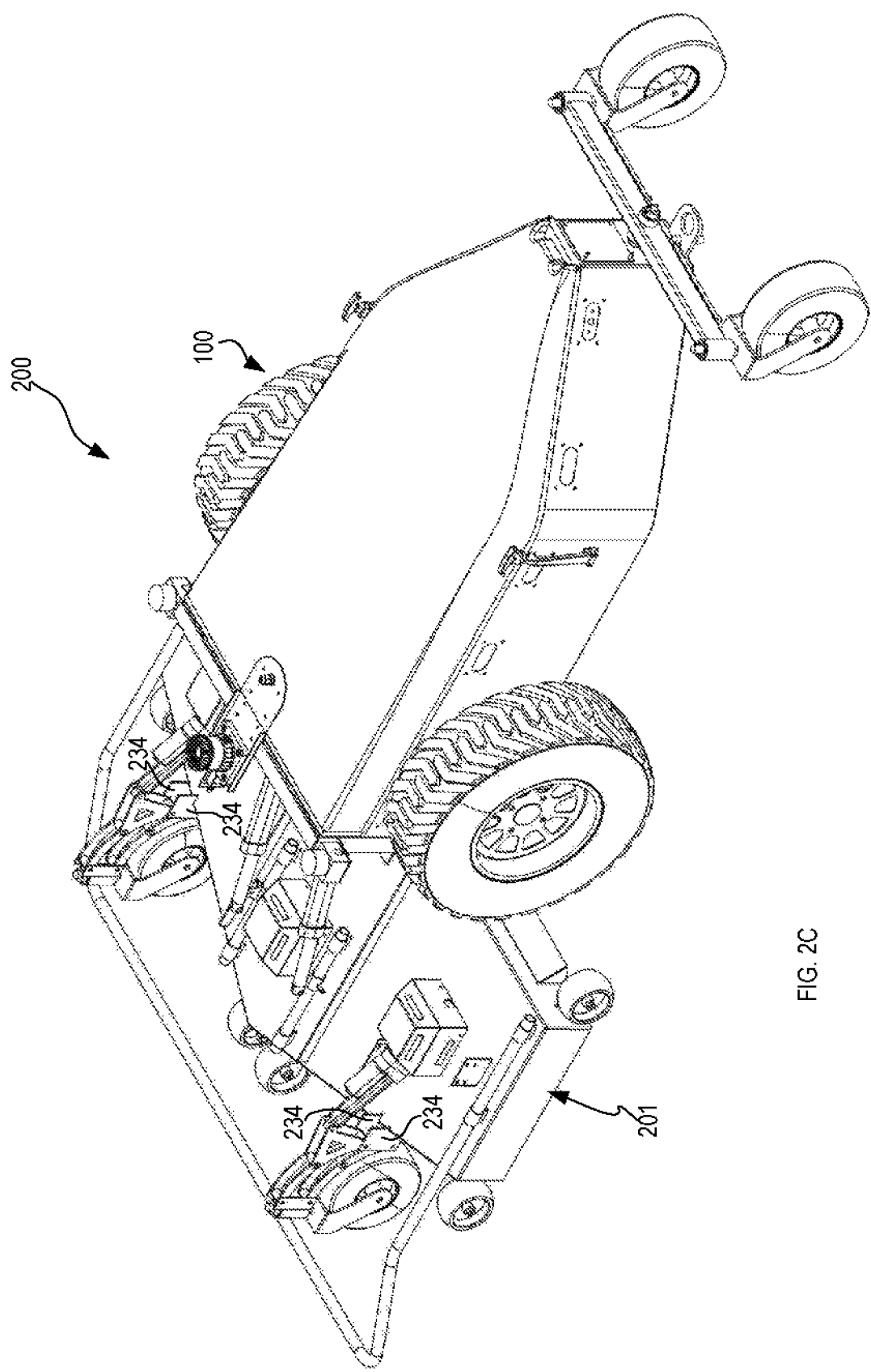
FIG. 2C is an oblique rear view embodiment of a mowing system.

Tractor 100 may be used as a part of various mobile automatic maintenance systems. FIG. 2A, for example, is a side of view of a mowing system 200 that comprises tractor 100 and a mowing deck 201 according to one embodiment, FIG. 2B is an oblique front view of mowing system 200 according to one embodiment and FIG. 2C is an oblique rear view of mowing system 200 according to one embodiment. According to one embodiment, mowing system 200 is an autonomous mowing system.

Mowing system 200 includes one or more blades disposed below a mowing deck 201. The mowing deck is supported by a number of wheels including contact wheels 202 which can be moved to maintain contact with the ground and other wheels 203. In other embodiments, the mowing deck 201 may be cantilevered from tractor 100 without supporting wheels. Power is provided through electrical connections to motors 204 on mowing deck 201 to drive the mower blades.

Mowing deck 201 is adapted to provide for low-profile mowing that can pass under solar panels, even when the solar panels are positioned close to the ground and the tractor cannot drive under them. For example, mowing deck 201 is disposed forward of tractor 100 and outside of the wheels of tractor 100. Thus, tractor 100 can drive the mowing deck 201 into spaces which tractor 100 itself cannot go, such as under panels that are lower to the ground than the top of tractor 100. The form factor of the mowing deck can be selected to achieve a desired cutting width and low profile. By way of example, but not limitation, mowing deck 201 can be configured as a 63-inch mowing deck that can operate with less than 24 inches of vertical clearance between the panel and ground, but still allow for mowing up to a height of at least 12 inches. Mowing deck 201 may be otherwise configured to have a larger or smaller width, to work in different clearances and to have different mowing heights.

According to one embodiment, the rear of mowing deck 201 is mounted to tool mounting bracket 120 using a hinged connection such that the front of mowing deck 201 can be tilted up. For example, mowing deck 201 includes rearwardly extending hinge members 210. Hinge pins 212 extend laterally from hinge members 210 to pass through the respective hinge pin openings 133. In some embodiments, hinge pins 212 comprise bolts that pass-through hinge members 210 and side plates 132. The hinge pins 212 define an axis of rotation for tilting mowing deck 201 relative to tractor 100.

Additionally, mowing deck 201 is coupled to tool mounting bracket 120 by tilt actuators 214, which are linear actuators driven by electric motors 215 in one embodiment. A first end of each tilt actuator 214 is rotatably coupled to tool mounting bracket 120 at attachment points 129. The second end of each tilt actuator 214 (e.g., the end of the drive tube, in the illustrated embodiment) is connected to the top of mowing deck 201 by a slidable connection or other connection that allows translation. More particularly, in the embodiment illustrated, guiderails 218 are attached to and spaced from the top surface of mowing deck 201 (e.g., by standoffs 219) and the second end of each tilt actuator is coupled, at a rotatable connection, to a sleeve 216 that is translatable along the respective guiderail 218. Biasing members, such as springs disposed about the guiderails 218, may be provided to bias the sleeves 216 forward or rearward.

Mowing system 200 thus includes a lift and tilt mowing deck 201. Retracting and extending lift actuators 134 lifts and lowers tool mounting bracket 120 and hence mowing deck 201. Retracting tilt actuators 214 tilts the front end of mowing deck 201 up and extending tilt actuators 214 lowers the front end of mowing deck 201. As discussed above, the capability to lift/tilt the mowing surface provides a mobile automated maintenance system the enhanced capability to adapt to different contours of the ground and provides the advantage of level cutting of vegetation by the mowing system. Moreover, the capability to tilt the mowing deck 201 increases the ease of maintenance. For example, the capability to tilt 30 degrees or more in some embodiments provides an operator easy access to replace or maintain the mowing blades. While the illustrated embodiment includes lift/tilt capabilities, other embodiments may include only lift capability, only tilt capability or neither.

In addition, or in the alternative, mowing deck 201 can include contact wheels 202 that are operationally coupled to contact wheel actuators 228 (e.g., by linkages 232). Contact wheel actuators 228, which may be linear actuators driven by electric motors 229 in one embodiment, can be actuated to maintain contact between contact wheels 202 and the ground and in some cases to maintain a desired amount of deck front pressure (e.g. pressure between wheels 202 and the ground). Moving wheels to maintain a desired amount of contact can allow mowing deck 201 to better follow the contour of the ground or to allow wheels 202 to continue to provide support at the front portion of mowing deck 201 when mowing deck 201 is lifted by lift actuators 134. Moreover, maintaining pressure on contact wheels 202 may be used to help regulate the traction of drive wheels 106.

In the embodiment illustrated, a first end of each contact wheel actuator 228 is rotatably coupled to the top of mowing deck 201. The second end of each contact wheel actuator 228 (e.g., the end of the drive tube, in the illustrated embodiment) is rotatably coupled to a respective linkage 232. A first end of each linkage is rotatably coupled to the front of mowing deck 201. For example, the end of each linkage 232 may capture a pin or other member disposed between a respective pair of forwardly extending plates 234. The distal end of each linkage 232 includes a collar 236 with an internal bushing to receive the shank of a respective contact wheel caster. Extending contact wheel actuators 228 causes the respective linkages 232 to rotate, pushing the respective contact wheels 202 down. Retracting contact wheel actuators 228 causes the respective linkages 232 to rotate and pull the respective contact wheels 202 up relative to mowing deck 201.

Mowing deck 201 may include a variety of sensors, such as sensors 238 to measure the frontside pressure at contact wheels 202 (one sensor 238 is visible in FIG. 2B, but a similar sensor can be provided for the other contact wheel). According to one embodiment, rotary sensors are used to output an indication of an amount of contact. In other embodiments, other sensors can be used. The output of sensors 238 can be used for active control of mowing deck and to provide information about the terrain that can be used in future control decisions.

Mowing deck 201 includes a bump bar 250. In some embodiments, bump bar 250 may incorporate a sensor to indicate that mowing system 200 has run into an obstacle. In another embodiment, bump bar 250 may incorporate a kill switch such that mowing system 200 will stop the blades, stop moving, shut down or take other action in response to bump bar 250 bumping into an obstacle with a threshold amount of force. The various motors and sensors associated with mowing deck 201 are electrically connected to controllers in main body 102.

Figure 3A:
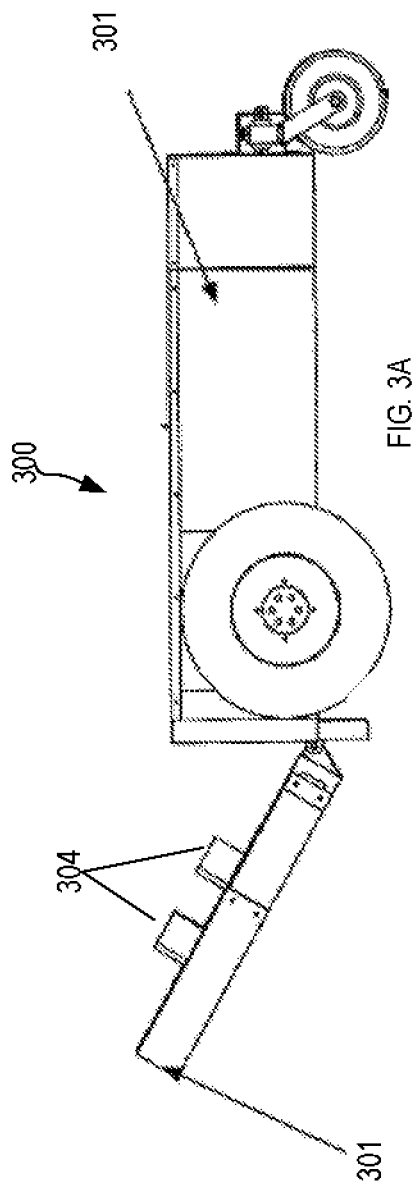
FIG. 3A is a side view of another embodiment mowing system.
Figure 3B:
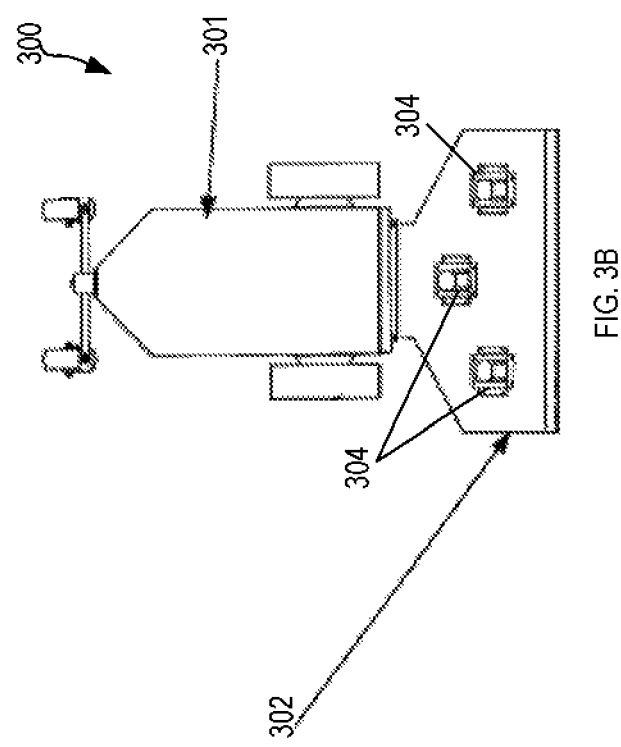
FIG. 3B is a top view of the mowing system of FIG. 3A according to one embodiment.
Figure 3C:
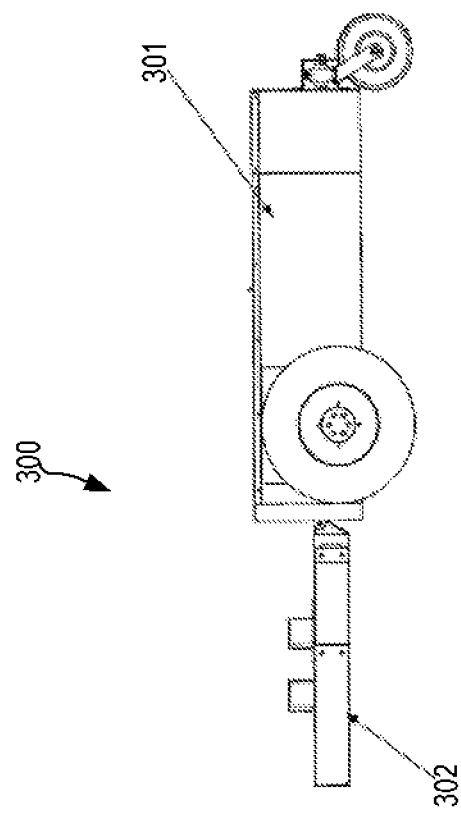
FIG. 3C is a side view of the mowing system of FIG. 3A in a second configuration according to one embodiment.

As discussed above, in some embodiments, a mowing deck may be a cantilevered rather than being supported by contact wheels 202 or other deck wheels 203. FIG. 3A, for example, is a side view of one embodiment of a mowing system 300 comprising a robot tractor 301 and a cantilever mowing deck 302. FIG. 3B is a top view of mowing system 300 according to one embodiment and FIG. 3C is a side view of mowing system 300 according to one embodiment. In FIG. 3A and FIG. 3B, mowing deck 302 is in a vertically lowered configuration and tilted up and in FIG. 3C mowing deck 302 is in a non-tilted (flat) configuration. Also indicated are blade motors 304.

Tractor 301 may be similar to tractor 100 discussed above and mowing deck 302 can connect to tractor 301 using a tool mounting bracket, such as tool mounting bracket 120, that is slidably coupled to the tractor 301. While not illustrated, it will be appreciated that mowing system 300 may include lift actuators, similar to lift actuators 134, to lift mowing deck 302 and tilt actuators, similar to tilt actuators 214, to tilt the mowing deck 302. Thus, for example, FIG. 3C illustrates mowing deck 302 in a non-tilted, raised configuration (e.g., the lift actuators are retracted or otherwise configured to raise the mowing deck 302).

It can be noted then the lift and tilt actuators can be independently controlled to provide increased control over the pitch (rotation about a lateral (side-to-side) axis) and roll (rotation about a longitudinal (front-to-rear) axis) of the mowing deck and the robot can be controlled to control the yaw (rotation about the vertical axis) of the mowing deck. It can be further noted that in some embodiments, all the motors, actuators in a robot or automated maintenance system may be electrical thus eliminating the possibility of hydraulic oil leaks that is present if hydraulic actuators are used.

Figure 4A:
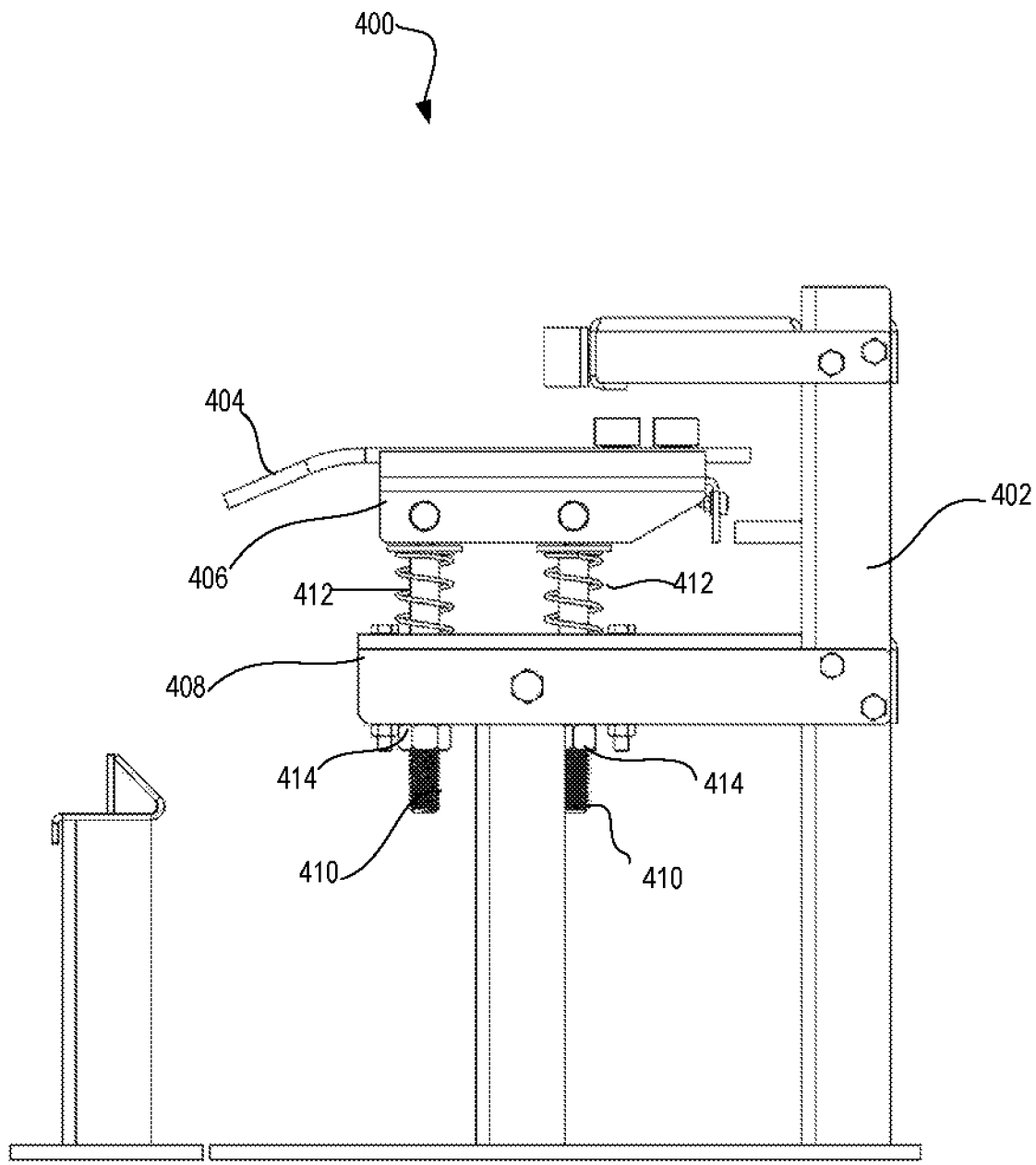
FIG. 4A is a side view of one embodiment of a charging dock.
Figure 4B:
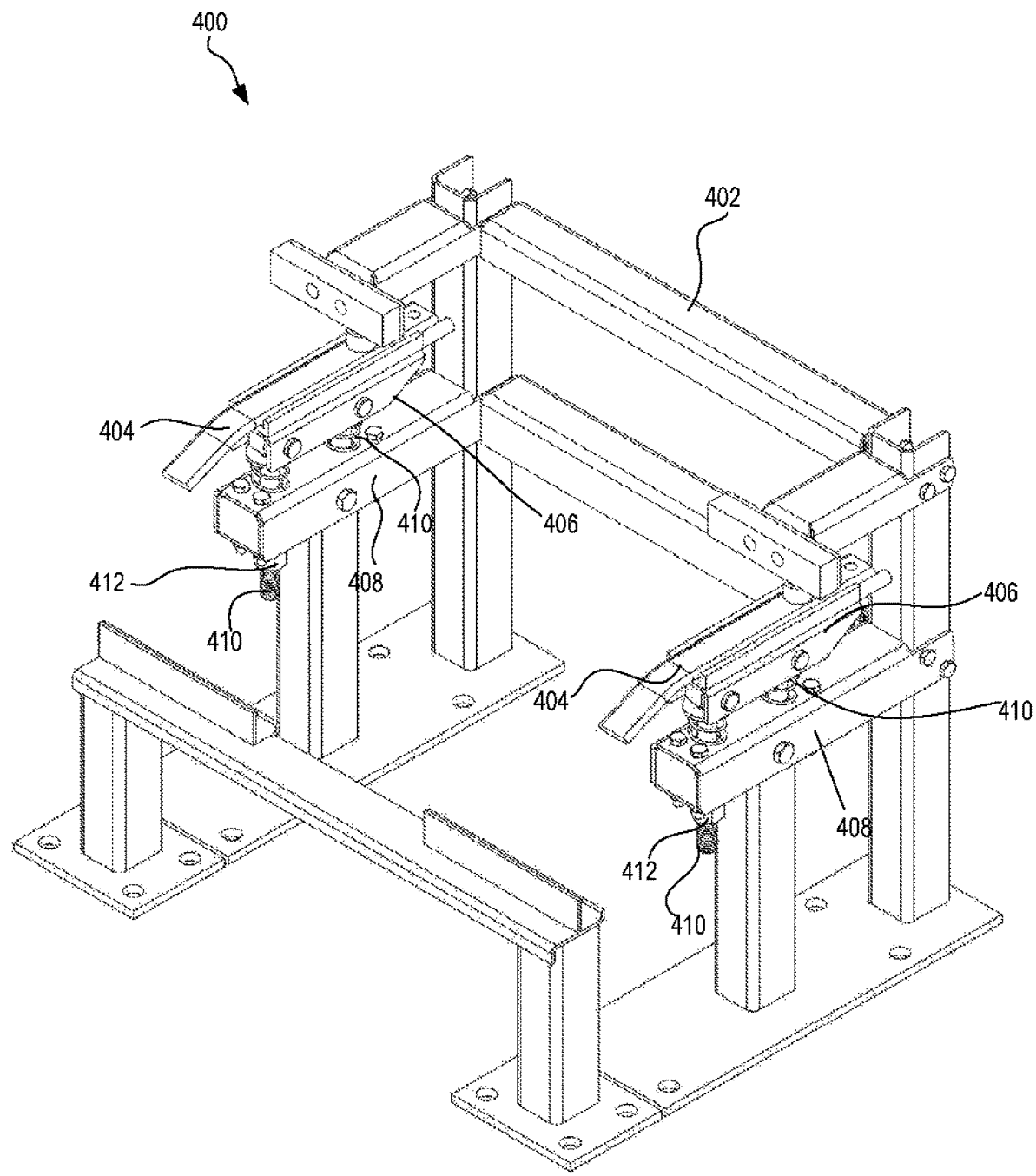
FIG. 4B is an oblique view of one embodiment of a charging dock.
Figure 5:
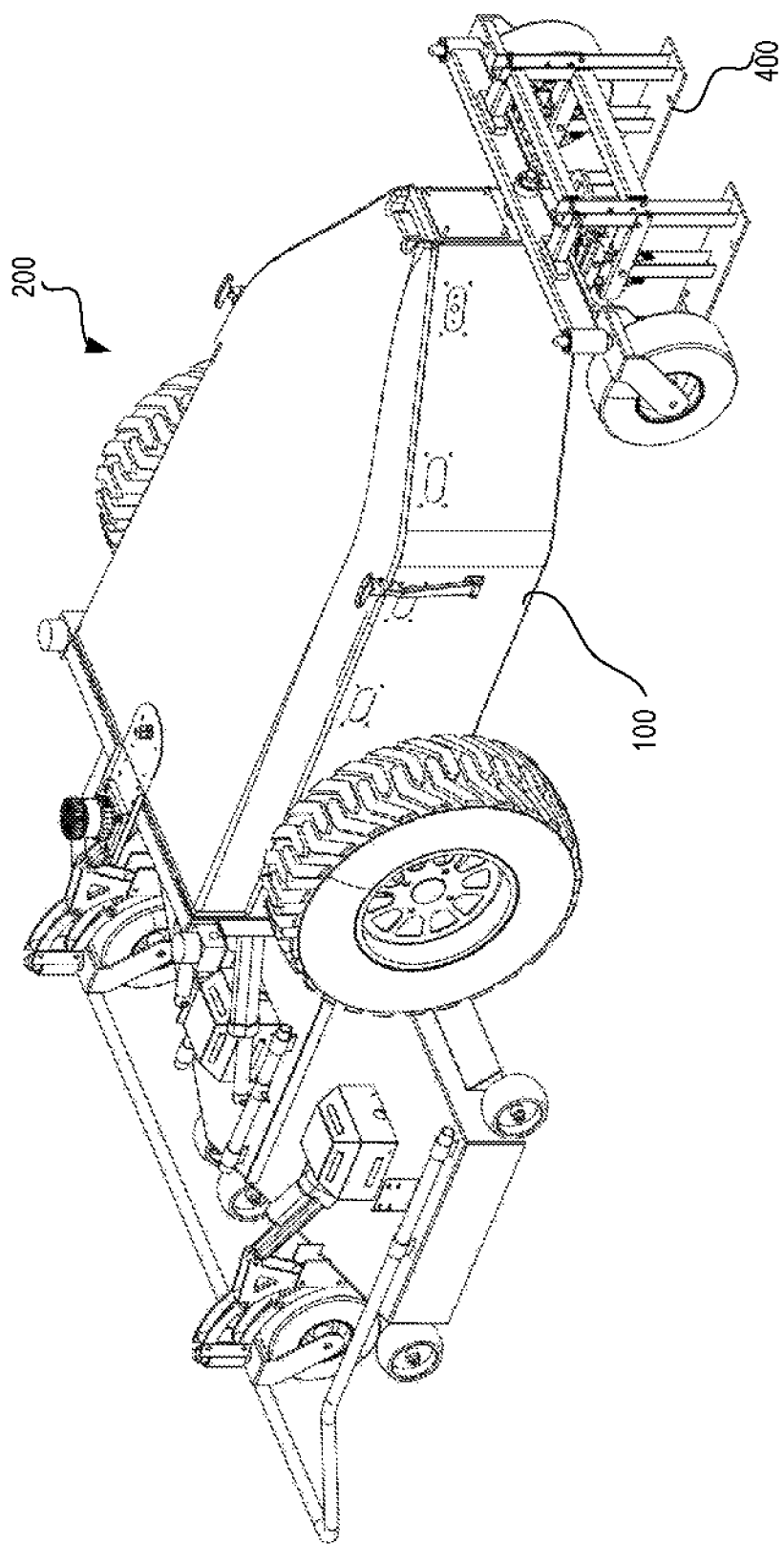
FIG. 5 is an oblique view of one embodiment of a mowing system docked at a charging dock.

FIG. 4A is a side view of one embodiment of a charging dock 400 according to one embodiment, FIG. 4B is an oblique view of charging dock 400 according to one embodiment and FIG. 5 is rear oblique view of one embodiment of mowing system 200 docked at charging dock 400.

Charging dock 400 may be part of a charge station that includes charging controllers, inverters or other components to facilitate charging. Charging dock 400 comprises a support frame 402 that can be bolted to a skid or other structure at a location accessible to one or more mobile automatic maintenance systems. Support frame 402 can include various members and features to assist the mobile automatic maintenance system in approaching the charging dock. Charging dock 400 includes charging station contacts 404 adapted to robot charger contacts 150 of tractor 100 or other mobile system. In the embodiment illustrated, charging station contacts 404 are plates of suitable conductive material that extend primarily longitudinally with respect to a docking tractor 100. Charging station contacts 404 are electrically connected to a power source via a charging station controller.

Charging contacts 404 are held by contact holders 406, which are coupled to and movable relative to support frame 402. In the illustrated embodiment, support frame 402 includes forwardly extending arms 408 and contact holders 406 are held above the arms 408. Bolts or other attachment members pass through the bottom portions of contact holders 406 and the through openings in arms 408. Springs 412 are disposed between the top surface of arms 408 and the bottom surfaces of contact holders 406 about the shafts of the bolts 410 to bias the contact holders 406 away from arms 408. Nuts 414 or other retaining members can limit movement of contact holders 406 away from arms 408. The front ends of the charging contacts 404 overhang the contact holders 406 and are angled downward to form ramp portions that facilitate docking.

In one embodiment, contact holders 406 hold the charging station contacts so that each ramp portion will vertically align with the respective robot charger contact 150. When tractor 100 approaches charging dock 400, robot charger contacts 150 will contact the front ramp portion of charging station contacts 404 first. As tractor 100 continues to move back into charging dock 400, contacts 150 will slide over contacts 404, pushing contact holders 406 down. The biasing force of springs 412 helps maintain connection between charging station contacts 404 and robot charger contacts 150. It can be noted that shapes and placement of contacts 150, 404 allow for charging to occur even if there is some misalignment between tractor 100 and charging dock 400.

Figure 6:
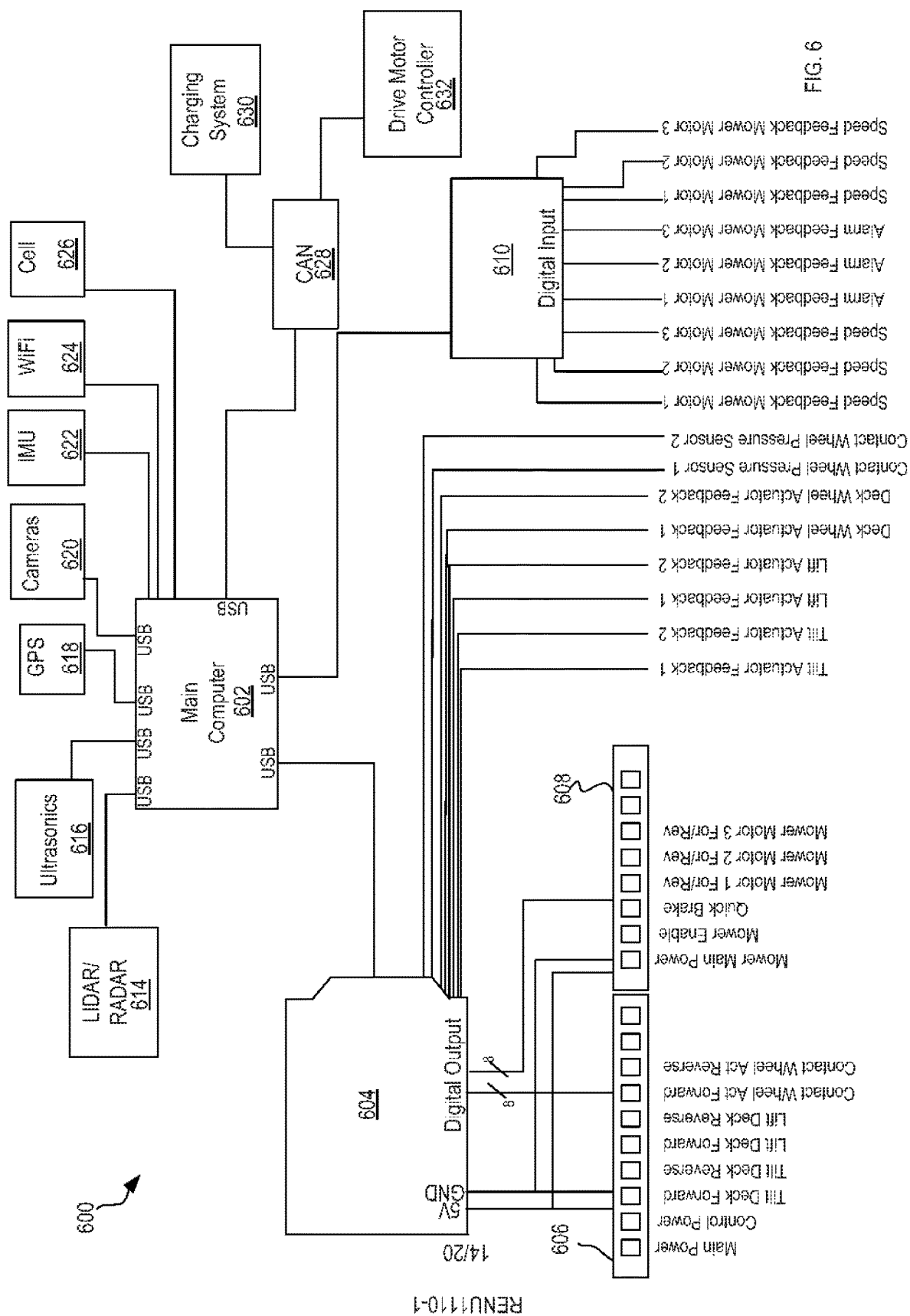
FIG. 6 is a diagrammatic representation of a control system of a mobile automated system according to one embodiment.

FIG. 6 is a diagrammatic representation of a control system 600 of a robot, such as a mobile automated system according to one embodiment. Components of FIG. 6 may be housed in an autonomous, unmanned vehicle, such as a tractor 100, 301 or other system. Control system 600 includes a main computer 602 to provide overall control of the tractor or other autonomous robot. According to one embodiment, main computer 602 is a computer system adapted for expected operating conditions of the robot. By way of example, but not limitation, main computer 602 may be a fan-less embedded system suited for industrial applications. Main computer 602 can include software and hardware to implement a state machine having, e.g., autonomy, halt-and-wait, and remote-control states, control autonomous navigation and maintenance operation functionality and other functionality described herein. One example of a main computer 602 is illustrated by computer 1302 of FIG. 13.

In the embodiment illustrated, main computer 602 is connected to various controllers that control the distribution of power to and receive feedback from various components. In the illustrated embodiment, main computer 602 is connected to a first controller 604 by a bus, such as a USB or other bus. First controller 604 controls the distribution of power to various components as needed. For example, first controller 604 controls logic relays 606 to provision main power for drive motor controller 632, control power to drive motor controller 632, forward or reverse power to tilt actuator motors 215, lift actuator motors 135, contact wheel actuator motors 229. Via relays 608, first controller 604 controls distribution of power to the motor controllers of mower motors 204. In this example, each mower motor controller has a main power input, an enable control signal input (e.g., high level/stop low level/run), a quick brake input (e.g., high level/stop, low/level run), a forward/reverse (F/R) input and/or other inputs. First controller 604 controls the signals to these inputs to start/stop and otherwise control power to the mower motors 204 as needed.

First controller 604 may also receive feedback from various components. For example, lift actuators 134, tilt actuators 214 and contact wheel actuators 228 may incorporate hall effect sensors or other sensors to provide feedback indicative of position, movement, or other related information. Moreover, first controller 604 can receive feedback from contact wheel pressure sensors 238. First controller 604 can provide data based on the feedback to main computer 602 indicative of, for example, speed, position or other condition of the actuators or contact wheels. As discussed above, the output of sensors 238 can be used for active control of the mowing deck and to provide information about the terrain that can be used in future control decisions.

Main computer 602 is further connected to second controller 610 via a communications bus, such as a USB. Second controller 610 may receive feedback from various components of the attached tool. In this example, second controller 610 connects to speed feedback outputs and alarm outputs of the mower motor controllers. In one embodiment, second controller provides hardware monitoring of various components of the attached tool and main computer 602 can provide software monitoring. Main computer 602 can be connected to various other components of the robot.

Further, one or more sensor components are connected to main computer 602 over a communications bus. For example, main computer 602 is connected to a LI DAR and/or RADAR unit 614, ultrasonic sensors 616, GPS 618, cameras 620 and an IMU 622. Main computer 602 may also be connected to (or include) various network interfaces. For example, main computer 602 may be connected to a W-Fi adapter 624 and a cellular network adapter 626. In the embodiment illustrated in FIG. 6, the communications bus is a USB. However, any suitable communications bus may be used. Further, in the embodiment of FIG. 6, main computer 602 is connected to one or more components of a charging system 630 and a drive motor controller 632 by a controller area network (CAN) 628 or other connection. Main computer 602 can, for example, communicate with drive motor control to control drive motors to turn the drive wheels and battery management system to receive data regarding battery status and control charging and discharging of batteries.

Control system 600 is provided by way of example and not limitation. In some embodiments, the control system 600 of a robot, such as a tractor 100, 301 or other mobile automated system, can be reconfigured for a particular type of tool. For example, for a cantilever mowing deck, there would not be a connection for (or the connection would not be used) for the deck wheel actuators, nor would connections for deck wheel actuator feedback be used. In some embodiments, control system 600 can be reconfigured as needed by providing appropriate controllers and/or software configuration of main computer 602.

Figure 7:
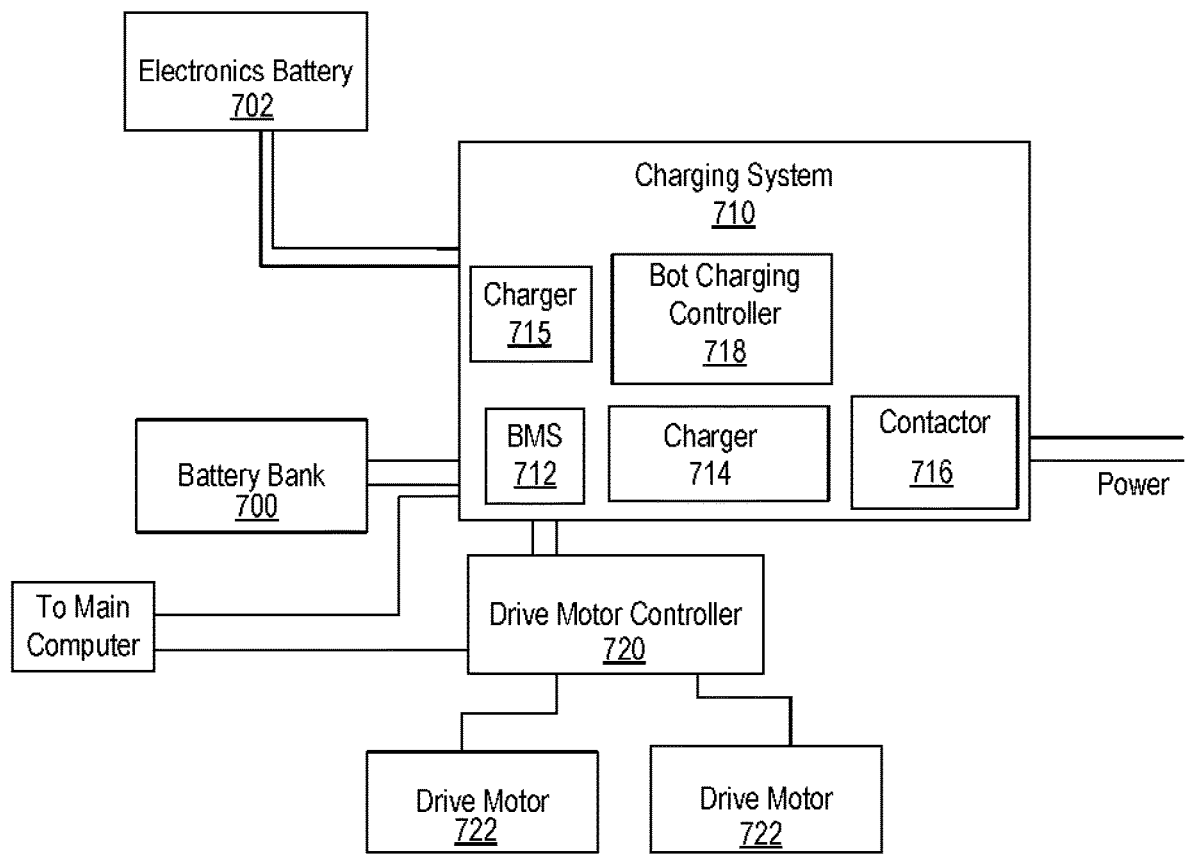
FIG. 7 is a block diagram illustrating one embodiment of power and drive components of a mobile automated system.

FIG. 7 is a block diagram illustrating one embodiment of power and drive components of a robot, such as tractor 100, tractor 301 or other mobile automated system. In the embodiment of FIG. 7, the robot includes a main battery bank 700 having one or more battery modules (for example one or more lithium ion or other rechargeable battery modules). The number of modules needed may be increased or decreased for a variety of reasons, including, but not limited to, altering the amount of power for the maintenance system based on the location of the maintenance system, and run time needed for the maintenance system and any attached devices. In one embodiment, the robot contains 8 48V battery modules, with each having approximately 2850 kWh of power. As will be well understood by one of ordinary skill in the art, the efficiency of battery systems may increase over time, and any number of battery modules may be used.

The battery modules of main battery bank 700 may be a higher voltage than supported by computers (e.g., main computer 602), actuators, various electronics or other components of the mobile automated system. In one embodiment then, the robot can include one or more secondary batteries 702 to power the main computer 602, various sensors, electronics, logic relays and other components. For example, according to one embodiment, a robot may include a common car, motorcycle, Gel cell battery or the like.

As illustrated in FIG. 7, the robot can include a charging system 710 that includes various components involved in charging the batteries. Charging system 710 can be an example of charging system 630. In the illustrated embodiment, charging system 710 includes battery management system (BMS) 712, charger 714, charger 715, contactor 716 and bot charging controller 718. Various components of charging system 710 can be connected to a bot computer (e.g., main computer 602) by a network or other communications link.

According to one embodiment, BMS 712 is directly connected to battery bank 700 and is adapted to manage and maintain batteries in battery bank 700. As will be appreciated, BMS 712 can provide various functionality with respect to the rechargeable batteries of main battery bank 700. By way of example, BMS 712 can provide constant monitoring of charge balance, generate alerts and implement preventive action to ensure proper charging. In one embodiment, BMS 712 assesses battery profiles for the battery modules of battery bank 700 and the temperature of the battery modules, oversees balancing, performs monitoring of battery health and ensure battery bank 700 is being charged in a safe manner (e.g., not being overcharged, not exceeding temperature limits, etc.). According to one embodiment, a bot computer (e.g., main computer 602) is connected to BMS 714 (e.g., by a CAN or other communication link) and monitors/controls whether BMS 714 allows charging.

Charging system 700 further includes a charger 714 to charge the batteries in battery bank 700. Charger 714 includes one or more chargers that have programmed profiles for the battery modules of battery bank 700. Charger 714 monitors the voltage of the battery bank 700 and, if a charging voltage is out of range, stops charging. Charging system 700 also includes a charger 715 to charge secondary battery 702 from main battery bank 700. In one embodiment, charging system 710 includes or is connected to a contactor 716 that is electrically coupled to the charging contacts of the robot (e.g., contacts 150). Contactor 716 can be selectively engaged and disengaged to allow charging when the bot is docked at a charging station.

Charging system 710 includes a bot charging controller 718 electrically coupled to the charging contacts (e.g., contacts 150). Bot charging controller 718, according to one embodiment, is configured to determine when the robot has docked with a charging dock and engage/disengage contactor 716 as needed to connect the charge power lines to charger 714 and/or BMS 712 to charge batteries in main battery bank 700. In one embodiment, the determination that the robot has docked successfully may be based, in part on a data communication between bot charging controller 718 and a charging station controller. Such communication may be implemented according to any suitable protocol including power-line protocols or other protocols. To this end, bot charging controller 718 may include a power-line communication or other adapter for communicating with the charging station.

The robot includes a drive motor controller 720, which may be one example of drive motor controller 632. Drive motor controller 720 is electrically connected to the drive motors 722 that turn the drive wheels of the robot. For example, in tractor 100, the drive motors 722 may connect to drive wheels 106 via hubs 107. According to one embodiment, drive motor controller 720 distributes power from battery bank 700 to drive motors 722 based on commands from the main computer. In some embodiments, drive motor controller 720 is connected to the main battery bank 700 through the charging system, for example, through BMS 712 or other component.

Figure 8:
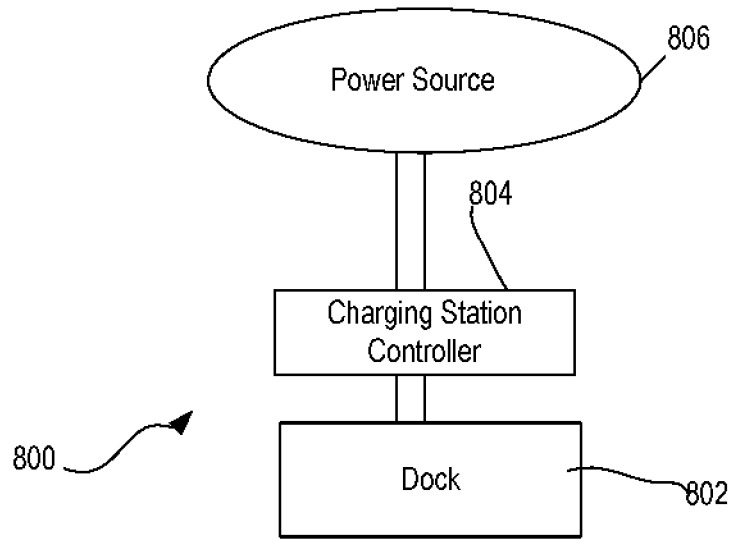
FIG. 8 is a diagrammatic representation of one embodiment of a charging station.

FIG. 8 is a diagrammatic representation of one embodiment of a charging station 800. Charging station 800 includes a charging dock 802 that provides a physical interface for electrically connecting to a robot. Charging dock 802 can include any compatible charger interface for charging a robot. One example embodiment of a charging dock is illustrated in FIG. 4A and FIG. 4B.

A charging station controller 804 is connected to charging dock 802 by one or more power connections and, in some embodiments, one or more data connections. Charging station controller 804 controls the distribution of power from one or more power sources 806 to dock 802. Power may be supplied from the local power grid, one or more power generators of the energy farm (e.g., one or more solar panels, wind turbines, or other generators) or other power sources 806. Power is provided through dock 802 to the robot to charge the system's batteries.

In some embodiments, charging station 800 also connects to the robot for charger data communications. Consequently, charging dock 802 may include charger data interface connections, which may be part of, or separate from, the charging connector. In addition, or in the alternative, charging station 800 and a robot can communicate using power-line communication. For example, bot charging controller 718 and charging station controller 804 may include power-line communications to facilitate such communication. In this case, the same contacts can act as connections for the charger power interface and a charger data interface.

Charging station controller 804, in some embodiments, has limited intelligence. For example, in one embodiment, charging station controller 804 includes logic to listen for and respond to data connection requests from a docked robot, and provide limited control over power (e.g., for safety), but once the robot has docked, the robot controls charging. When charging station controller 804 senses a potential at dock 802 indicating that a robot has docked and, for example, contactor 716 has engaged, charging controller 804 supplies power to dock 802. The robot can control charging by selectively engaging and disengaging contactor 716.

Figure 9:
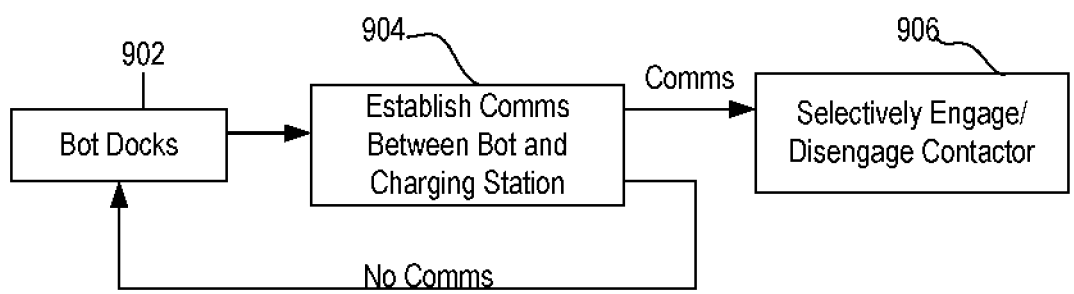
FIG. 9 is a block diagram illustrating one embodiment of a docking and charging process.

FIG. 9 is a diagrammatic representation of one embodiment of a docking procedure. At 902, the robot (e.g., tractor 100, tractor 301 or other mobile automated system) attempts to dock with the charging station 800. When the robot determines that it is at a position associated with being docked, control passes to block 904. At 904, the robot attempts to establish communication with the charging station 800 via a charger data interface. For example, the robot may attempt a handshake or other procedure to establish communications. In some embodiments, bot charging controller 718 attempts to establish data communications with charging station controller 804 using a power-line communication data protocol or other protocol. If charger data communications cannot be established, charging controller 718 signals the bot computer (e.g., main computer 602) and the robot attempts to redock. If data communications can be established with the charging station, this indicates that the robot has successfully docked, and control passes to 906 where the charging controller can charge the robot's batteries as needed.

As will be appreciated, battery manufacturers provide profile information for batteries such as voltage range in which to keep the battery, floats to maintain and other information. Bot charging controller 718 uses the battery profile information and analysis parameters (e.g., health of the battery provided by BMS 712) and rules regarding charging to extend the life of the battery to determine whether to engage/disengage contactor 716 or otherwise selectively charge the batteries. Thus, for example, if the batteries are nearly fully charged when robot device docks, the bot charge controller 718 may determine that it does not need to charge and does not engage contactor 716. At 906, the robot can control charging as needed (e.g., by engaging and disengaging contactor 716).

Figure 10:
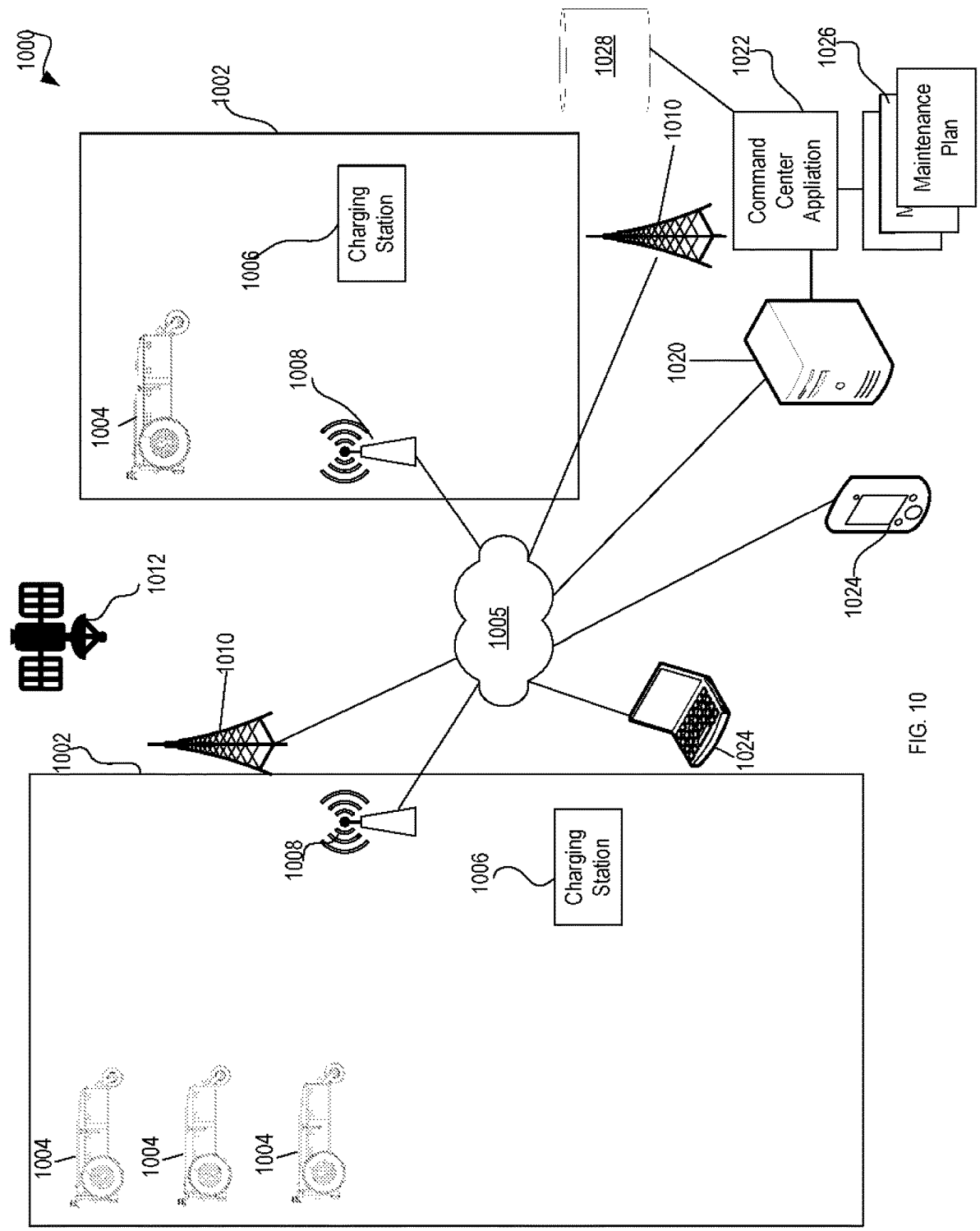
FIG. 10 is a diagrammatic representation of a communication network embodiment for controlling and monitoring a fleet of autonomous mowing tractors.

Turning now to FIG. 10, one embodiment of a distributed maintenance system 1000 is illustrated. An operator may have multiple, geographically distributed sites 1002 (e.g., renewable energy farms or other sites) at which automated maintenance operations are to be performed. To facilitate such operations, robots that provide automated maintenance systems can be deployed to each site. The number and type automated maintenance systems deployed can depend, for example, on the size of each site, the types of maintenance operations to be performed, the frequency of maintenance and other factors. Robots 1004 may thus provide a variety of mobile automated maintenance systems such as, but not limited to, mowing systems, inspection maintenance systems, cleaning maintenance systems, fire protection maintenance systems, repair maintenance systems or other mobile automated maintenance systems. The deployed robots 1004 may include, in some embodiments, an autonomous robot, such as tractor 100 or 103 or may otherwise employ various features described herein.

One or more charging stations 1006 (e.g., charging stations 800 or other charging stations) are deployed at each site 1002. Charging stations 1006 can be connected to the local power grid, directly to the renewable energy farm or to other power source. Each charging station 1006 includes an interface to connect with and provide power to robots 1004. In some embodiments, charging stations 1006 may also have the capability to establish charger communications with a docked deployed robot 1004 via power-line communication or other protocol that uses the charger power lines or other connections.

Robots 1004 can connect to and communicate with a central management system 1020 via a network 1005. Network 1005 can include a combination of wired and wireless networks that may be utilized for various types of network communications. According to one embodiment, one or more wireless devices 1008 (e.g., access points, gateways) are deployed at each site 1002 to create a wireless network at the site 1002 that is connected to network 1005. The type of wireless devices 1008 deployed may depend on the type of network connectivity available at the site 1002. For example, a wireless device 1008 may be a device that connects to the Internet through to a local ISP, a satellite data network, a GPRS network or other cellular data network. If there is an available GPRS network or other cellular data network or cell-based radio network technology mobile network (e.g., as represented by towers 1010), the deployed robot 1004 may also connect to that network to communicate with central management system 1020. In some embodiments, charging stations 1006 may also communicate with central management system 1020 via network 1005. Robots 1004 can receive commands, configuration information, updates, and other data from central control system 1020 and send status information, alerts, collected data and other information to central management system 1020. Further as illustrated, robots 1004 receive GPS data from a GPS network 1012.

Central management system 1020 comprises one or more computer systems with central processing units executing instructions embodied on one or more computer readable media where the instructions are configured to perform at least some of the functionality associated with embodiments of the present invention. In the illustrated embodiment, these applications include command center application 1022.

Command center application 1022 comprises one or more applications configured to implement one or more interfaces utilized by central management system 1020 to gather data from or provide data to client computing devices 1024, robots 1004, various information provider systems or other systems. Central management system 1020 utilizes interfaces configured to, for example, receive and respond to queries from users at client computing devices 1024, interface with robots 1004 or other components of the distributed maintenance system, interface with various information provider systems, obtain data from or provide data obtained, or determined, by central management system 1020 to client computing devices 1024, information provider systems, robots 1004 or other components of the distributed maintenance system. It will be understood that the particular interface utilized in a given context may depend on the functionality being implemented by central management system 1020, the type of network 1005 utilized to communicate with any particular entity, the type of data to be obtained or presented, the time interval at which data is obtained from the entities, the types of systems utilized at the various entities, etc. Thus, these interfaces may include, for example, web pages, web services, a data entry or database application to which data can be entered or otherwise accessed by an operator, APIs, libraries or other type of interface which it is desired to utilize in a particular context.

An operator can establish maintenance plans 1026 (e.g., inspection plans, cleaning plans, mow plans) for a site 1002 to be maintained. With respect to mowing for example, a site 1002 can be broken into a grid and a mow plan established for each portion of the grid, where the mow plan for a grid portion specifies the paths a mowing system is to follow to mow that grid portion.

A path is considered to be a line that exists in real world space between two GPS coordinate points, or other coordinate system points. Paths have a start point and an end point defined by GPS coordinates. According to one embodiment, paths can be either straight or curved, and are typically definable by some mathematical geometric construct, such as a line or curve in two-dimensional space, or a line or spline in three-dimensional space, as examples. Paths can be generated either manually or algorithmically. Robots 1004 can use paths as a guide for driving. As a robot traverses along the path, the robot (e.g., its main computer 602 or other onboard processing system) compares its position via GPS coordinates to the path and makes corrections as necessary to follow the path as accurately as the mechanical capabilities and/or precision of the sensors of the robot will allow. Paths are generally lines of travel which are defined in a way to allow the robot to safely traverse near and around static obstacles in the operating space. A route is a collection of paths, which are interconnected either at end points or any point along intersecting paths, referred to as "nodes."

Figure 11:
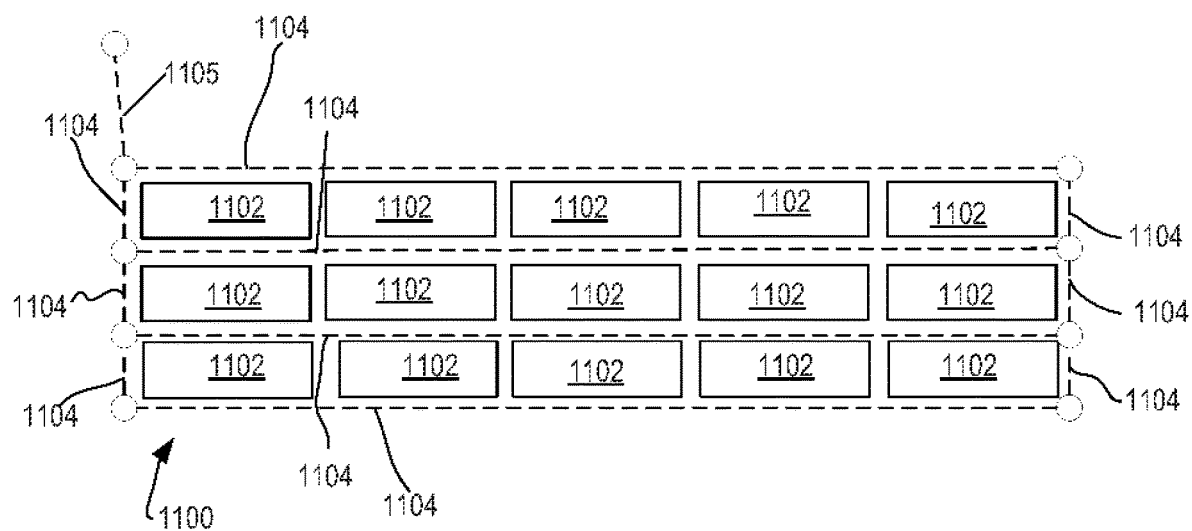
FIG. 11 is a block diagram illustrating one embodiment of paths for a mow plan.

Turning briefly to FIG. 11, one embodiment of an area to be maintained 1100, such as a portion of a site 1002, is illustrated. In this example, the area includes multiple solar panels 1102. A maintenance plan for the area specifies a set of paths 1104 to be covered by a mobile automated maintenance system when executing the maintenance plan. While paths 1104 are each shown as linear paths, paths 1104 may be arbitrarily complex. Implicit to performing the maintenance plan is getting to the area to be maintained. Thus, paths to the area (e.g., from one or more charging stations or other locations) can be part of the maintenance plan. For example, a path 1105 between the area to be maintained to a charging station is illustrated. The nodes are also indicated. In some embodiments, the robot implements a nodal traversal approach to determine the shortest route to achieve a maintenance plan.

A maintenance plan may also include other information associated with each path 1104, such as actions to perform along the path, or other information associated with each path or locations along paths. For example, certain paths in a mow plan may be indicated as a transit section and others as mowing sections. Transit sections are paths where the robot moves from one area to another without mowing, and mowing sections are areas where the robot follows a path that ensures that all of the grass is cut in the area.

Returning to FIG. 10, a maintenance plan 1026 may thus include a path definition for each path of the plan and each plan may have associated path information defined in the maintenance plan or otherwise accessible to a robot implementing the maintenance plan. Associated path information may include, for example, information such as type of path (e.g., mow or transit in a mow plan), actions to perform along the path or other information that is used in implementing the maintenance plan. According to one embodiment, each path in a maintenance plan has an associated expected power draw. The expected power draw may be established in various ways. For example, the expected power draw may be a historical power consumption for the path. In another embodiment, the expected power draw is a statistical estimate of the power draw based on the historical power consumption for the path or similar paths collected by one or more robots. In another embodiment, the expected power draw is a calculation based on simulated data or estimated input parameters.

Maintenance plans can be distributed via network 1005 to robots 1004 as appropriate. In some embodiments, a robot 1004 may be configured with one or more maintenance plans and a schedule for performing the maintenance plans. In some embodiments, a robot 1004 is configured with a maintenance cycle comprising multiple maintenance plans. When the robot 1004 completes a maintenance plan, it can move to the next maintenance plan in the cycle. For example, a mowing system can be configured with a mow cycle of multiple mow plans and, when the mower system completes a mow plan in a mow cycle, it can move to a next mow plan in the mow cycle.

Robots 1004 can implement a state machine having, for example, autonomy, halt-and-wait and remote-control states. In the autonomy state, a robot 1004 can autonomously execute maintenance plans with which it is configured. In one embodiment, central management system 1020 can communicate with a mobile automated device to put it in the autonomy state, halt-and-wait state or remote-control state as needed. The robot 1004 may also change states unilaterally based on the occurrence of various events.

In some cases, the path information associated with the paths of maintenance plan 1026 may change over time even if the paths do not. For example, the estimated power to complete a path of a maintenance plan may increase or decrease based on weather conditions, time of year or other factors. According to one embodiment, a robot 1004 can query central management system 1020 for current information associated with the paths of a maintenance plan prior to execution of the maintenance plan.

Executing a maintenance plan may include performing autonomous navigation to follow paths or routes, performing maintenance operations and take other actions without human intervention. Autonomous navigation can include path and route following, collision avoidance and other aspects of autonomous navigation known or developed in the art. A robot 1004 can continuously record its progress and report its progress to centralized management system 1020. This can include for example, reporting areas of a maintenance plan that were missed (e.g., due to obstacle avoidance) or that the robot 1004 was unable to complete (e.g., due to returning to the charger).

As will be appreciated, when in the autonomy state a robot 1004 can navigate with high-precision GPS-based localization along the predefined paths of a maintenance plan. The robot 1004 can also include an IMU or other sensors to provide additional information useful in navigating. The robot 1004 uses sensors to detect objects in the system's path with which it may impact (e.g., obstacles, animals, workers in the area, equipment left on the ground or other obstacles). Such sensors include, but are not limited to ultrasonics, RADAR, LI DAR, two- and three-dimensional imaging systems, probes, which are capable of sensing surface locations in reference to the sensor.

If the robot 1004 determines that intervention is required, for example due to the mobile automated maintenance system encountering an object it cannot navigate around, becoming stuck or other such situation, the robot 1004 can send an alert to a central management system 1020 and, in some cases, enter a halt-an-wait state until it receives further instructions. The central management system 1020 may put the robot 1004 in the remote-control state to allow for operator control of the robot 1004.

With respect to the remote control stage, central management system 1020 can provide an interface, such as a web page or mobile application page, to a client computer device 1024 to allow an operator to stream camera data and sensor data or otherwise view data collected or produced by the robot. Central management system may also provide a user interface with controls through which an operator can control the robot 1004. Commands entered by the operator (e.g., movement commands or other commands) are routed to the robot 1004 via network 1005. Central management system 1020 can further return the mobile automated system to an autonomy state when the operator has completed controlling the robot 1004. In some embodiments, each robot 1004 may also provide a user interface accessible over a local network (e.g., a network provided by a wireless device 1008) to allow a user to manually control the robot 1004.

As will be appreciated, distributed maintenance system 1000 includes a number of supervisory features including a network link to the robot 1004. As another example, central management system 1020 can maintain a database 1028 of what each robot 1004 is supposed to be doing and what it has done. Further, distributed maintenance system 1000 provides hands-on intervention. An operator can look at what has been done and what needs to be done with respect to site maintenance and determine whether maintenance plans need to be altered or other actions taken. Moreover, if a robot 1004 detects an event/anomaly it cannot deal with, it can alert human user and human user can take control of the robot (change the maintenance plan, tell it to go home, drive it remotely.) If a plan needs to be updated, the operator can use central management system 1020 to put the robot 1004 in a halt-and-wait state, update the plan and put the robot 1004 back in the autonomy state.

Figure 12:
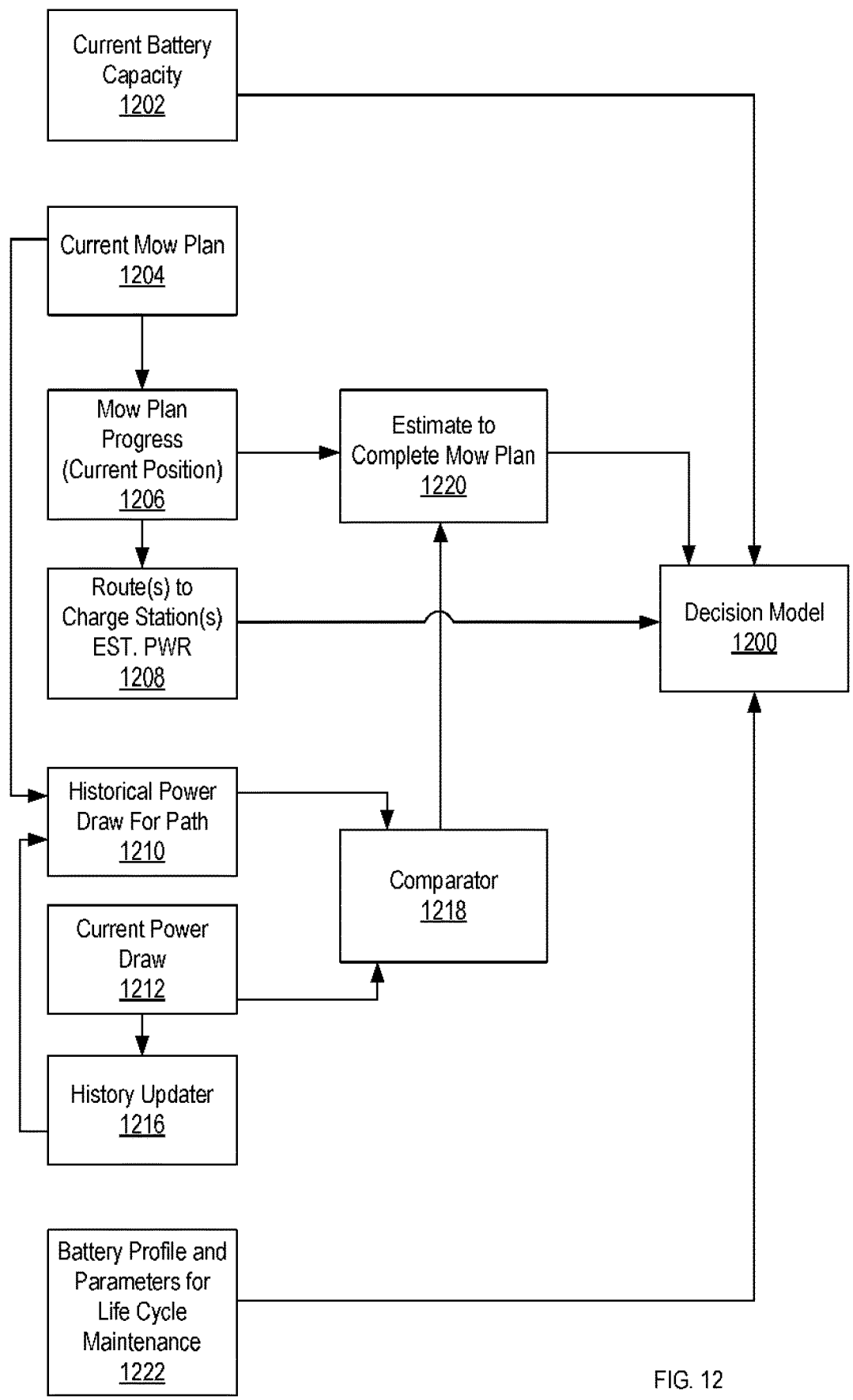
FIG. 12 is a block diagram illustrating one embodiment of a return to charger decisioning process.

Various features can be implemented to extend battery life. Some of these features may be implemented in the charge controller or BMS of the robot. Others may be algorithmically implemented by a control system, such as a main computer 602. Turning briefly to FIG. 12, a block diagram illustrating one embodiment of a decisioning process for determining whether to complete a maintenance plan or return to a charger. For the sake of example, FIG. 12 is discussed in terms of a mow plan, but it will be appreciated that a similar decisioning can be implemented for other types of maintenance plans.

In the embodiment of FIG. 12, the robot (e.g., robot 1004, tractor 100, tractor 300 or other mobile automated system) is configured with a return for charge decision model 1200 that is trained or otherwise configured to output a decision on whether to continue on a path or return to a charger. According to one embodiment, decision model 1200 is a machine learning model or other model configured to output a decision on whether to charge. Even more particularly, decision model 1200 is a decision tree. Other models, including rules-based models may also be used. In general, decision model 1200 can be trained to keep a robot, to the extent possible, within the recommended conditions for extending battery life provided by the battery manufacturer or otherwise determined. A robot 1004 configured with a maintenance plan can continuously determine whether to return to a charger or make the determination at each node or other locations along a path or route.

According to one embodiment, the robot reads the current battery capacity 1202 (e.g., from the BMS) and uses the current battery capacity 1202 as an input to the decision model 1200. The robot uses the current mow plan 1204 and tracks its current mow plan progress 1206. For example, the robot continuously tracks its current position in the mow plan and how much of the mow plan is left to complete). The robot determines an initial estimate of the power needed to complete the mow plan based on the unfinished paths (and unfinished portion of the current path) and their expected power draws. The robot further continually calculates the path back to the nearest charge station or available charge station and the estimated power 1208 to return from its current position to a charge station. The expected power 1208 to return to a charge station is used as an input to the decision model 1200.

The robot accesses the expected power draw (e.g., the historical power draw 1210) for the current path. The robot further monitors the current power draw 1212 for the current path and implements a history updater 1216 to update the historical power draw information associated with the current path. The robot implements a comparator 1218 to compare the historical power draw 1210 to the current power draw 1212 for the path. The result of the comparison is used to determine the estimate to complete the mow plan 1220. As noted above, the robot determines an initial estimate to complete the mow plan.

The results of the comparison can be used to adjust the initial estimate to complete the mow plan to determine the estimate to complete the mow plan 1220. For example, if the current power draw 1212 for the path is higher than the historical power draw 1210 for the path, this may indicate the initial estimate to complete the mow plan should be increased to determine the estimate to complete the mow plan 1220. In any event, the estimate to complete the mow plan 1220 is provided as input to decision model 1200. Battery manufacturers provide profile information for batteries, such as voltage range in which to keep the battery, floats to maintain and other information useful to extend the life of the battery pack. The robot further accesses a battery profile and a set of parameters for lifecycle maintenance 1222 and provides these as inputs to decision model 1200. The output decision model either indicates that the robot should continue on its current path or return to the charger for charging. In the latter case, the robot returns to the charger. If the robot finishes its current path, the robot can apply return for charge decision model 1200 to determine whether the robot can pick up a next path or should return to a charging station.

Returning to FIG. 10, a variety of other features may be implemented. According to one embodiment, a charging system 1006 has the capability to provide a charge, through an inverter, from a solar farm itself. The inverter is connected to the solar panels by a common bus. In one embodiment, the charger allows charging from a common bus of between 500 and 1500 VDC. Energy available on the common bus is being supplied directly by the solar panels. When the inverter is not energized, such as when the solar farm is not sending energy to the grid, the charger can switch charging of the maintenance system from the common bus. One of the advantages of such a system is that a robot can maintain optimal charge and be ready to perform maintenance functions when needed, even if the farm itself cannot charge the maintenance system.

In some cases, a robot 1004 may be fully charged, but have no maintenance to perform. In order to maintain peak functionality of the batteries contained within the robot, it may be advantageous to discharge the robot's batteries. According to one embodiment, a charging station 1006 may have the ability to provide energy to the common bus from the batteries of the mobile automated maintenance system. One example of such a scenario is if maintenance on the farm is completed, power is readily available from the farm, and the robot determines that the robot's batteries can be discharged without loss of future operational capability. In such a scenario, the robot can discharge the robot's batteries back to the common bus. The operator of the system can then receive monetary compensation for such discharge. In a further embodiment, mobile automated maintenance systems provide energy storage via their batteries, reducing the need for a portion of battery storage that may be present at some renewable energy farms (i.e., by moving that battery storage from fixed batteries of the farm to the batteries of the robots.).

The need to run particular maintenance systems may fluctuate. For example, with regards to lawn maintenance, the growing of the grass may vary depending on a wide variety meteorological and ground conditions and the need for an operator to run mobile automated maintenance systems may increase when growth rate is higher, and decrease when it is lower. In one embodiment, the robot maintains battery charge between 20 and 90%, and more particularly between 30 and 90%, or within a battery manufacturer's recommended range, to maximize battery life. Maintaining the charge in range may include discharging the batteries as needed, stopping charging, selecting mowing routes, returning for charging before a mow plan is completed or otherwise taking actions as needed to maintain the desired charge. Decisions regarding maintaining battery life may be made onboard the robot or at a centralized management system and communicated to the mobile automated maintenance system.

In one embodiment, centralized management system 1020 or robots 1004 analyzes environmental, meteorological, current grounds status and maintenance system requirements to determine what the operational need, or work required, of the robots. In addition to this type of analyses, the operator of the system may enter in such information that cannot be quantified. This may include, without limitation, the operator providing information to a mobile automated maintenance system such as information reflecting the operator's knowledge that a portion of the farm never receives the predicted rainfall by meteorological predictions due to local conditions (such as a mountain or hill), information reflecting the operator's knowledge that an unscheduled maintenance cycle on the batteries in the field that will occur in short order, removing the need for optimal battery life in those batteries or information reflecting other operator knowledge. In other words, some embodiments have the ability to take non-measurable conditions into consideration when determining operational need.

According to one embodiment, central management system 1020 analyzes the current battery capacity of one or more of the robots. The system then determines which robots 1004 can be used to perform the operational need without deviating from the optimal battery capacity during the performing of those operations. This may include running a robot 1004 when its battery capacity is near the optimal low end while charging another mobile automated maintenance system to within the optimal range and swapping the depleted mobile automated maintenance system for the charged mobile automated maintenance system. This may be performed iteratively during an operational need, or until the current operational need changes based on further analyses.

The balancing of performing the operational need with the life of the batteries can be refined over time. According to one embodiment, the mobile automated maintenance systems continuously report their status back to the management system such that predictive analysis of their conditions and their future conditions can be performed continuously. Through such continuous operations, the management system can react to changing conditions, including unscheduled maintenance of the mobile automated maintenance systems.

In some embodiments, autonomous mowing systems can operate without regard to human schedules. In one embodiment, robots 1004 have sensors disposed on them that provide for grass height measurements. In some examples this may be restricted to robots 1004 that perform mowing functions. However, it may be advantageous for other maintenance systems to also measure grass height.

The sensors used for the operation of an autonomous system may also perform grass height measurements. These sensors may include, without limitation, LI DAR, IMU and GPS. LI DAR may include, in some examples, 3D laser scanning, a combination of 3D scanning and laser scanning. In an alternate embodiment, sensors may be dedicated to the measurement of the grass height. In a further embodiment, grass height measurements made by the maintenance systems may be augmented by measurements from other devices, such as unmanned aerial vehicles. While specific mention of sensor systems has been made, it will be well understood by those of ordinary skill in the art, that any sensor type suitable for grass height measurement may be used, including mechanical means, without departing from the spirit of the embodiments described herein.

A variety of other features may also be implemented by robots 1004 or central management system 1020.

Figure 13:
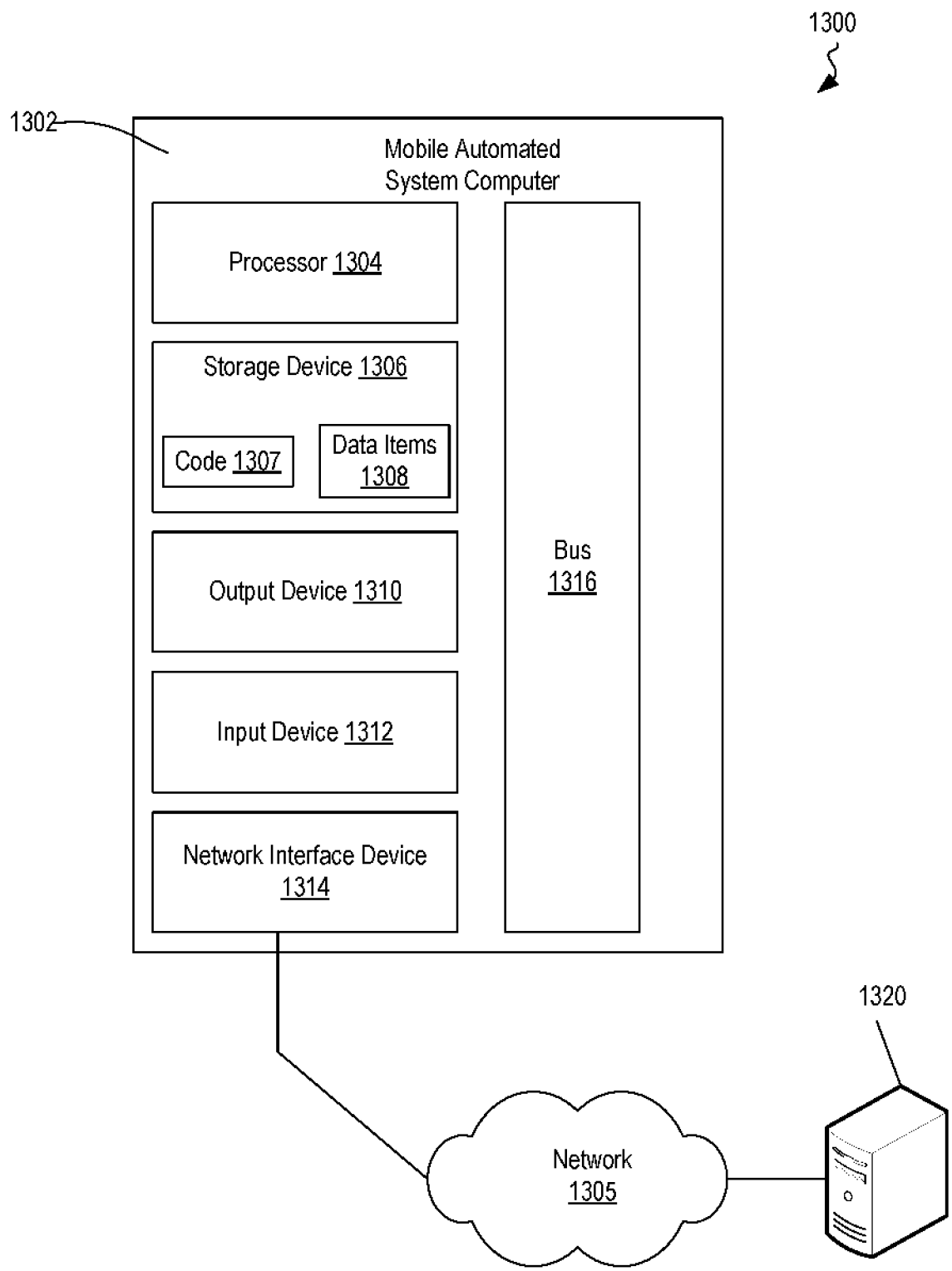
FIG. 13 is a diagrammatic representation of one embodiment of a maintenance network system.

FIG. 13 is a diagrammatic representation of one embodiment of a maintenance network system 1300 comprising a mobile automated system computer 1302 communicatively coupled to a central management system 1320 via a network 1305. Mobile automated system computer 1302 may be one example of a computer for controlling a robot including a robot that provides a mobile automated maintenance system. Computer 1302 may be one embodiment of a robot main computer 602. Central management system 1320 may be one embodiment of central management system 1020. Computer 1302 includes a processor 1304, a storage device 1306, an output device 1310, an input device 1312, and a network interface device 1314 connected via a bus 1316. Processor 1304 represents a central processing unit of any type of processing architecture, such as CISC (Complex Instruction Set Computing), RISC (Reduced Instruction Set Computer), VLIW (Very Long Instruction Word), a hybrid architecture, or a parallel architecture. Any appropriate processor may be used. Processor 1304 executes instructions and may include that portion of the computer that controls the operation of the entire computer. Processor 1304 may include a control unit that organizes data and program storage in memory and transfers data and other information between the various parts of the computer. The processor receives input data from the input device 1312 and the network, reads and stores code and data in the storage device 1306 and outputs data to the output devices 1310. While a single processor, input device, storage device output device and single bus are illustrated, computer 1302 may have multiple processors, input devices, storage devices, output devices and busses with some or all performing different functions in different ways.

Storage device 1306 represents one or more mechanisms for storing data. For example, storage device 1306 may include read-only memory (ROM), random access memory (RAM), magnetic disk storage media, optical storage media, flash memory devices, solid state device storage media, and/or other machine-readable media. In other embodiments, any appropriate type of storage device may be used. Multiple types of storage devices may be present. Additionally, multiple and different storage devices and types may be used in conjunction with each other to perform data storage functions for the computer. Further, although the computer is drawn to contain the storage device, it may be distributed across other computers communicatively coupled over a suitable network, for example on a remote server.

Storage device stores code 1307 and data items 1308 therein. Code 1307 can include instructions executable by processor 1304 to carry out various functionality described herein, including but not limited to autonomous navigation. In one embodiment, code 1307 is executable to implement a state machine having, for example, an autonomy state, a hold-and-wait state and a remote-control state. In another embodiment, some or all of the functions are carried out via hardware in lieu of a processor-based system. As will be understood by those of ordinary skill in the art, the storage device may also contain additional software and data (not shown). Data items 1308 can include a wide variety of data including, but not limited to, configuration data, data collected by the mobile automated system during use, data provided to the mobile automated system by central management system 1320 or other system, maintenance plans, path information, and other data. Although the code 1307 and the data items 1308 as shown to be within the storage device 1306 in the computer 1302, some or all of them may be distributed across other systems communicatively coupled over the network, for example on a server.

Output device 1310 represents devices that output data to a user or direct data to be sent to other systems connected through the network. The output may be a liquid crystal display (LCD), in one example, though any suitable display device may be used. In an embodiment, an output device displays a user interface. Any number of output devices can be included, including output devices intended to cause data to be sent to other systems connected through network 1305. Input device 1312 represents one or more devices that provide data to processor 1304. Input device 1312 can represent user input devices (e.g., keyboards, trackballs, keypads and the like), sensors or other input devices.

The network interface device 1314 provides connected between the computer 1302 and network 1305 through any suitable communications protocol. The network interface device 1314 sends and receives data items from the network. Bus 1316 may represent one or more busses, e.g., USB (Universal Serial Bus), PCI (Peripheral Component Interconnect), ISA (Industry Standard Architecture), X-Bus, EISA (Extended Industry Standard Architecture), MCA (Micro Charnel Architecture), IEEE 1394, or any other appropriate bus and/or bridge.

Computer 1302 may be implemented using any suitable hardware and/or software. Peripheral devices such as auto adapters or chip programming devices, such as EPROM (Erasable Programmable Read-Only Memory) programming devices may be used in addition to, or in place of the hardware already depicted. Computer 1302 may be connected to any number of sensors or other components via a bus, network or other communications link.

Network 1305 may be any suitable network and may support any appropriate protocol suitable for communication to the computer. Network 1305 can include a combination of wired and wireless networks that network computing environment of FIG. 8 may utilize for various types of network communications. For example, network 1305 can include a local area network (LAN), a hotspot service provider network, a wide area network (WAN), the Internet, GPRS network or other cellular data network or cell-based radio network technology mobile network, an IEEE 802.IIx wireless network or other type of network or combination thereof. According to an embodiment, network 805 may support the Ethernet IEEE 802.3x specification. According to an embodiment, network 805 may support IP (Internet Protocol) over either or UDP (User Datagram Protocol).

According to one embodiment, a mobile automated system can communicate with a central management system 1320 via network 1305 to communicate data to and receive data and commands. For example, computer 1302 may send status information, alerts, collected data and other information to central management system 1320. Similarly, computer 1302 can receive updated routing information, maintenance plans, decision algorithms from central management system 1320. According to one embodiment, code 1307 implements watchers to watch for various commands from central management system.

In one embodiment, a mobile automated system may operate in various states including, but not limited to an autonomy state and a remote-control state. In an autonomous state, the mobile automated system (e.g., under the control of computer 1302) performs autonomous navigation to follow routes, implements maintenance plans) and takes other actions without human intervention. Autonomous navigation can include route following, collision avoidance and other aspects of autonomous navigation. In some cases, the mobile automated system may encounter a situation that requires intervention, such as becoming stuck or encountering an obstacle that the mobile automated system cannot navigate around. The mobile automated system can send alerts to central management system 1320 and, in some cases, await further instructions before moving again.

Central management system 1320 may communicate with computer 1302 to update the mobile automated system, put the mobile automated system in a manual state or carry out other actions. Central management system 1320 can provide an interface, such as a web page or mobile application page, through which an operator can control the mobile automated system in the manual state. Commands entered by the operator (e.g., movement commands or other commands) are routed to computer 1302 over network 1305 and computer 1302 controls the mobile automated system to implement the commands. Central management system 1320 can further return the mobile automated system to an autonomous state. Central management system 1320 may provide a centralized management for a large number of geographically dispersed mobile automated systems. One example of a central management system 1320 is discussed above in conjunction with FIG. 10.

Those skilled in the relevant art will appreciate that the embodiments can be implemented or practiced in a variety of computer system configurations including, without limitation, multi-processor systems, network devices, mini-computers, mainframe computers, data processors, and the like. Embodiments can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, stored as firmware in chips, as well as distributed electronically over the Internet or over other networks (including wireless networks). Example chips may include Electrically Erasable Programmable Read-Only Memory (EEPROM) chips.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. Steps, operations, methods, routines or portions thereof described herein be implemented using a variety of hardware, such as CPUs, application specific integrated circuits, programmable logic devices, field programmable gate arrays, optical, chemical, biological, quantum or nanoengineered systems, or other mechanisms.

Software instructions in the form of computer-readable program code may be stored, in whole or in part, temporarily or permanently, on a non-transitory computer-readable medium. The computer-readable program code can be operated on by a processor to perform steps, operations, methods, routines or portions thereof described herein. A "computer-readable medium" is a medium capable of storing data in a format readable by a computer and can include any type of data storage medium that can be read by a processor. Examples of non-transitory computer-readable media can include, but are not limited to, volatile and non-volatile computer memories, such as RAM, ROM, hard drives, solid state drives, data cartridges, magnetic tapes, floppy diskettes, flash memory drives, optical data storage devices, compact-disc read-only memories. In some embodiments, computer-readable instructions or data may reside in a data array, such as a direct attach array or other array. The computer-readable instructions may be executable by a processor to implement embodiments of the technology or portions thereof.

A "processor" includes any hardware system, mechanism or component that processes data, signals or other information. A processor can include a system with a general-purpose central processing unit, multiple processing units, dedicated circuitry for achieving functionality, or other systems. Processing need not be limited to a geographic location or have temporal limitations. For example, a processor can perform its functions in "real-time," "offline," in a "batch mode," etc. Portions of processing can be performed at different times and at different locations, by different (or the same) processing systems.

Different programming techniques can be employed such as procedural or object oriented. Any suitable programming language can be used to implement the routines, methods or programs of embodiments of the invention described herein, including R, Python, C, C++, Java, JavaScript, HTML, or any other programming or scripting code, etc. Communications between computers implementing embodiments can be accomplished using any electronic, optical, radio frequency signals, or other suitable methods and tools of communication in compliance with known network protocols.

Any particular routine can execute on a single computer processing device or multiple computer processing devices, a single computer processor or multiple computer processors. Data may be stored in a single storage medium or distributed through multiple storage mediums. In some embodiments, data may be stored in multiple databases, multiple filesystems or a combination thereof.

Although the steps, operations, or computations may be presented in a specific order, this order may be changed in different embodiments. In some embodiments, some steps may be omitted. Further, in some embodiments, additional or alternative steps may be performed. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

It will be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Thus, while the invention has been described with respect to specific embodiments thereof, these embodiments are merely illustrative, and not restrictive of the invention. Rather, the description (including the Abstract and Summary) is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A robot comprising:
   a drive system capable of autonomously conveying the robot from a first location to a second location;
   a navigation system for autonomously and continuously determining the location and orientation of the robot, the navigation system comprising a global positioning system (GPS) subsystem, said navigation system operably coupled to the drive system;
   a control system operably coupled to the drive system and navigations system, the control system configurable to store a set of paths; and
   a cantilevered mowing deck, disposed forward of the primary physical plant that houses the drive system and operably coupled to the drive system and the control system, the mowing deck capable of autonomous tilt and lift motions relative to the drive system.

2. The robot of claim 1, further comprising an autonomous sensing system for supporting autonomous navigation, the sensing system comprising LIDAR subsystem, the sensing system operably coupled to the navigation system.

3. The robot of claim 2, wherein the control system is further configurable to autonomously determine at least one new path for inclusion among the set of paths, said determining based at least in part on data gathered by the autonomous sensing system.

4. The robot of claim 2, wherein the control system is further configurable to control the drive system to maneuver the robot along at least one path from among the set of paths, and wherein the control system is further configurable to autonomously select at least one alternative path to said at least one path from among the set of paths.

5. The robot of claim 1, further comprising a plurality of contact wheels rotatably coupled to the mowing deck, the contact wheels each comprising one or more sensors operably coupled to the control system and enabling the control system to maintain contact between the plurality of contact wheels and the ground while the robot is in motion.

6. The robot of claim 1, wherein the drive system includes at least two drive wheels capable of propelling and turning the robot.

7. The robot of claim 6, wherein the robot is a zero-turn robot.

8. The robot of claim 1, wherein the mowing deck comprises at least one mower blade coupled to at least one mower motor, wherein the control system is further configured to control the at least one mower motor.

9. The robot of claim 1, further comprising a battery system operably coupled to at least the drive system, said battery system comprising at least one battery.

10. The robot of claim 9, wherein the control system is further configurable to autonomously control the drive system to maneuver the robot tractor to dock at a charging station.

11. The robot of claim 10, further comprising a charger interface operably coupled to the battery system, the charger interface further comprising at least two charger contacts, the charger contacts each comprising a laterally extending plate of conductive material.

12. The robot of claim 11, wherein the charger contacts provide a power interface and a data interface, wherein the power interface is capable of receiving recharging power from a charging station, and wherein the data interface is capable of transmitting data to and receiving data from the charging station.

13. The robot of claim 12, wherein the control system is further configurable for:
   autonomously attempting to establish communication with the charging station via the data interface when docked at the charging station;
   if communications cannot be established, autonomously redocking the robot at the charging station iteratively until either communication is established with the charging station via the data interface or a threshold number of redock attempts is exceeded; and
   if and only if communication with the charging station is established via the data interface, autonomously charging the one or more batteries via the power interface.

14. The robot of claim 12, wherein the transmitting data to and receiving data from the charging station utilizes a communication protocol, and wherein the communication protocol is a power-line communication protocol.

15. A robot system comprising:
   a sensing system for supporting autonomous navigation, said sensing system comprising a LIDAR subsystem;
   a drive system capable of autonomously conveying the robot system from a first location to a second location, the drive system comprising at least two drive wheels capable of propelling and turning the robot system;
   a navigation system for autonomously and continuously determining the location and orientation of the robot system;
   a cantilevered mowing deck, disposed forward of the primary physical plant that houses the drive system and capable of autonomous tilt and lift motions relative to the drive system, the mowing deck comprising a plurality of mower blades coupled to at least one mower motor, the mower motor being separate from the drive system; and
   a control system configurable to store a set of paths, control the drive system to maneuver the robot system along at least one path from among the set of paths, controlling the mower motors, and autonomously determining, based at least in part on data gathered by the sensing system, at least one path for inclusion or deletion from among the set of paths.

16. The robot system of claim 15, further comprising a plurality of contact wheels rotatably coupled to the mowing deck, the contact wheels each comprising one or more sensors operably coupled to the control system and enabling the control system to maintain contact between the plurality of contact wheels and the ground while the robot system is in motion.

17. The robot system of claim 15, further comprising:
   a battery system comprising at least one battery; and
   a charger interface operably coupled to the battery system, the charger interface comprising at least two charger contacts, the charger contacts each comprising a laterally extending plate of conductive material, and said charger contacts being capable of receiving charging power from a charging station as well as transmitting data to and receiving data from the charging station;

wherein the control system is further configurable to autonomously dock the robot system at the charging station.

18. The robot system of claim 17, wherein the control system is further configurable for:
   autonomously attempting to establish communication with the charging station via the charger contacts upon docking at the charging station;
   if communications cannot be established, autonomously redocking the robot system tractor at the charging station iteratively until either communication is established with the charging station via the charger contacts or a threshold number of redock attempts is exceeded; and
   if and only if communication with the charging station is established via the charger contacts, autonomously charging the at least one battery via the power interface.

19. An autonomous robotic mower (ARM) comprising:
   a drive system capable of conveying the ARM from a first location to a second location;
   a cantilevered mowing deck, disposed forward of the primary physical plant that houses the drive system and capable of autonomous tilt and lift motions relative to the drive system, the mowing deck comprising a plurality of mower blades coupled to at least one mower motor, the at least one mower motor being separate from the drive system;
   a battery system comprising one or more batteries; and
   a charger interface operably coupled to the battery system, the charger interface comprising at least two charger contacts, the charger contacts each comprising a laterally extending plate of conductive material, and said charger contacts being capable of receiving charging power from a charging station as well as transmitting data to and receiving data from the charging station.

20. The autonomous robotic mower of claim 19, further capable of:
   docking at a charging station;
   attempting to establish communications with the charging station via the charger contacts;
   if communications cannot be established, redocking the autonomous robotic mower tractor at the charging station iteratively until either communication is established with the charging station via the charger contacts or a threshold number of redock attempts is exceeded; and
   if and only if communication with the charging station is established via the charger contacts, autonomously charging, via the charger interface, at least one battery from among the one or more batteries.

* * * * *